(12) United States Patent
Zhang et al.

(10) Patent No.: US 11,082,970 B2
(45) Date of Patent: Aug. 3, 2021

(54) METHOD AND DEVICE FOR DETERMINING TRANSMISSION PARAMETERS AND STORAGE MEDIUM

(71) Applicant: ZTE CORPORATION, Guangdong (CN)

(72) Inventors: Shujuan Zhang, Shenzhen (CN); Yijian Chen, Shenzhen (CN); Yu Ngok Li, Shenzhen (CN); Zhaohua Lu, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/497,736

(22) PCT Filed: Mar. 26, 2018

(86) PCT No.: PCT/CN2018/080569
§ 371 (c)(1),
(2) Date: Sep. 25, 2019

(87) PCT Pub. No.: WO2018/177262
PCT Pub. Date: Oct. 4, 2018

(65) Prior Publication Data
US 2020/0389879 A1    Dec. 10, 2020

(30) Foreign Application Priority Data
Mar. 25, 2017 (CN) .......................... 201710185413.5

(51) Int. Cl.
*H04W 72/04* (2009.01)
(52) U.S. Cl.
CPC ................................ *H04W 72/044* (2013.01)
(58) Field of Classification Search
CPC ................................................... H04W 72/044
See application file for complete search history.

(56) References Cited

U.S. PATENT DOCUMENTS 10,505,690 B2 * 12/2019 Yu .......................... H04W 76/15
2013/0286994 A1 * 10/2013 Liu ........................ H04L 5/0051
370/329

(Continued)

FOREIGN PATENT DOCUMENTS

| CN | 103889060 A | 6/2014 |
| CN | 105101422 A | 11/2015 |

(Continued)

OTHER PUBLICATIONS

International Search Report of Application No. PCT/CN2018/080569—4 pages (dated Jun. 15, 2018).

(Continued)

*Primary Examiner* — Rasheed Gidado
(74) *Attorney, Agent, or Firm* — Knobbe, Martens, Olson & Bear, LLP

(57) ABSTRACT

Provided are transmission parameter determination method and device, and storage medium. The method includes: acquiring multiple transmission parameter sets, where the multiple transmission parameter sets at least include: a first transmission parameter set, a second transmission parameter set, transmission parameters having a same type; determining multiple resource areas, where the multiple resource areas at least include: a first resource area, a second resource area; each resource area includes at least one of: time domain resource area, code domain resource area, frequency domain resource area, spatial domain resource area, reference signal resource area; sending information or receiving information on the multiple resource areas according to the multiple transmission parameter sets, which at least includes: sending information or receiving information on the first resource area according to the first transmission parameter set; and sending information or receiving infor- (Continued)

mation on the second resource area according to the second transmission parameter set.

20 Claims, 10 Drawing Sheets

(56) References Cited

U.S. PATENT DOCUMENTS

| | | | | |
|---|---|---|---|---|
| 2015/0063284 A1* | 3/2015 | Liu | ............... | H04L 7/0008 |
| | | | | 370/329 |
| 2016/0255612 A1* | 9/2016 | Sartori | ............... | H04W 48/12 |
| | | | | 370/329 |
| 2019/0124631 A1* | 4/2019 | Ren | ............... | H04W 72/0466 |

FOREIGN PATENT DOCUMENTS

| | | |
|---|---|---|
| CN | 106385709 A | 2/2017 |
| EP | 2696618 A1 | 2/2014 |
| EP | 2827632 A1 | 1/2015 |
| EP | 3197087 A1 | 7/2017 |
| EP | 3282623 A1 | 2/2018 |
| WO | WO 2016/041368 A1 | 3/2016 |

OTHER PUBLICATIONS

Supplementary European Search Report for EP 18778241 dated Nov. 27, 2020.
Panasonic: "Control signalling design on downlink resource allocation", Feb. 12, 2017, 3GPP TSG-RAN WG1 Meeting #88, XP051210409—R1-1703279.

* cited by examiner

METHOD AND DEVICE FOR DETERMINING TRANSMISSION PARAMETERS AND STORAGE MEDIUM

CROSS-REFERENCES TO RELATED APPLICATIONS

This application is a U.S. National Stage Application, filed under 35 U.S.C. 371, of International Patent Application No. PCT/CN2018/080569, filed on Mar. 26, 2018, which claims a priority to a Chinese patent application No. 201710185413.5 filed on Mar. 25, 2017, disclosure of which are incorporated herein by reference in their entireties.

TECHNICAL FIELD

The present disclosure relates to the field of communications and, in particular, to a transmission parameter determination method, a transmission parameter determination device, and a storage medium.

BACKGROUND

At present, a self-containment structure is proposed in the discussion of NR-5G, i.e., in a time unit (such as a slot), a base station sends downlink data to a terminal. The terminal feeds back ACK/NACK of downlink data in an uplink transmission domain in the slot, thereby accelerating transmission period of the data, especially for services with relatively high latency requirement.

For such services with high latency requirement, how to further accelerate data demodulation rate at a receiving end needs to be further studied.

In view of the technical problem of low data demodulation rate at the receiving end in the existing art, no effective solution has yet been proposed.

On the other hand, the dynamic change of many transmission parameters included in the LTE is not very large. Dynamic control signaling overhead is wasted when dynamic notification is performed at every change. How to implement a transmission parameter notification which can both adapt to the dynamic resource scheduling and save the signaling overhead, no effective solution has yet been proposed.

SUMMARY

Embodiments of the present disclosure provide a transmission parameter determination method and device, and a storage medium for at least solving the problem in the existing art of a low modulation data rate at a receiving end.

According to an embodiment of the present disclosure, a transmission parameter determination method is provided. The method includes: acquiring multiple transmission parameter sets, where the multiple transmission parameter sets at least include: a first transmission parameter set, a second transmission parameter set, and transmission parameters having a same type; determining multiple resource areas, where the multiple resource areas at least include: a first resource area, a second resource area; each resource area includes at least one of: a time domain resource area, a code domain resource area, a frequency domain resource area, a spatial domain resource area, a reference signal resource area; sending information or receiving the information on the multiple resource areas according to the multiple transmission parameter sets, which at least includes: sending the information or receiving the information on the first resource area according to the first transmission parameter set; and sending the information or receiving the information on the second resource area according to the second transmission parameter set.

In an embodiment, sending the information or receiving the information on the multiple resource areas according to the multiple transmission parameter sets includes: at an independent acting section of one resource area, sending or receiving the information at the independent acting section according to the transmission parameter set corresponding to the resource area; or at an intersected section of N resource areas in the multiple resource areas, sending or receiving the information at the intersected section according to N transmission parameter sets corresponding to the N resource areas; or at an intersected section of N resource areas in the multiple resource areas, sending or receiving the information at the intersected section according to one of the N transmission parameter sets corresponding to the N resource areas; or where N is a natural number greater than 1.

In an embodiment, according to a transmission parameter type or indication information, determining to adopt at least one of the following manner at an intersected section of N resource areas in the multiple resource areas to process the information: manner one: sending or receiving the information at the intersected section according to a combination of multiple transmission parameter sets in N transmission parameter sets; manner two: sending or receiving the information at the intersected section according to one of the N transmission parameter sets; where N is a natural number greater than 1.

In an embodiment, a division mode of the multiple resource areas includes at least one of: dividing according to a time acquiring control information; receiving the control information to determine division of the multiple resource areas, where the control information includes division information of the multiple resource areas; determining the division of the multiple resource areas according to an area that the control information acts and in which the transmission parameter sets are located; and determining the division of the multiple resource areas according to a rule agreed by a receiving end and a sending end.

In an embodiment, the multiple resource areas are divided according to at least one parameter of a group consisting of: a transmission parameter type, a channel type, a signal type, a service type, a transceiver antenna configuration, a structure type of a time domain resource unit to which the resource areas belong, a Numerology configuration of the resource areas, a transmission mode/a transmission technology/a transmission manner used at the time of the resource area transmitting, an information type transmitted in the resource area, and a transmission direction.

In an embodiment, the transmission parameters having the same type include one or more of the following: a precoding bundling parameter, a Quasi-Co-Location (QCL) relation indication parameter, a resource configuration parameter, a rate matching parameter, a reference signal configuration related parameter, a receiving mode configuration parameter, a transmission technology/mode, a transmission mode, a mapping/interleaving parameter, a sending beam configuration parameter, a modulation order configuration parameter, an encoding rate configuration parameter, a modulation code scheme (MCS) configuration parameter, a number of codewords, a number of transmission layers, a multiple access manner, a resource multiplexing manner, a waveform configuration parameter, a sending power configuration parameter, a numerology parameter, a hybrid automatic repeat request (HARQ) related parameter, a measurement parameter, a feedback parameter and a sending mode.

In an embodiment, the second resource area is a subset of the first resource area; an intersection set between the second resource area and the first resource area is empty; the intersection set between the second resource area and the first resource area is non-empty, and the second resource area and the first resource area do not overlap; the first resource area and the second resource area are same; the first resource area is changed according to the second resource area.

In an embodiment, a determination manner of values of partial parameters and all parameters included in the first transmission parameter set includes at least one of: In an embodiment, a determination manner of values of partial parameters and all parameters included in the first transmission parameter set includes at least one of: determining according to a previously configured transmission parameter set, determining according to radio resource control configuration signaling, determining according to medium access control (MAC) configuration signaling, determining according to system information block (SIB) message, determining according to a physical broadcast channel (PBCH) message, determining according to common control information, determining according to a previous agreement of a sending end and a receiving end.

In an embodiment, partial parameters and all parameters included in the second transmission parameter set are determined according to transmission information of the first resource area.

In an embodiment, in the second transmission parameter set, athere exists at least a type of parameters which correspond to a candidate configuration set A, and parameters having the same type in the first transmission parameter set correspond to a candidate configuration set a; where the A is a set constituted by configurable states, the a is a true subset of the A or the A is a true subset of the a.

In an embodiment, the method satisfies at least one of following characteristics: according to a configuration of the first transmission parameter set, determining a configurable range of parameters having the same type as the first transmission parameter set in the second transmission parameter set; determining a configurable range of a transmission parameter set having a late sending time according to a configurable range of a transmission parameter set having an early sending time; determining a number of bits occupied by the second transmission parameter set in a control information notification domain according to the configuration of the first transmission parameter set; where the control information notification domain notifies second transmission parameter set information. The control information notification domain notifies second transmission parameter set information.

In an embodiment, the first transmission parameter set includes multiple subsets, the first resource area includes multiple subareas, the subsets and the subareas are associated; and/or the second transmission parameter set includes multiple subsets, the second resource area includes multiple subareas, where the subsets and the subareas are associated.

In an embodiment, at a time point, updating partial parameters or all parameters in the first transmission parameter set having the same type as that in the second transmission parameter set to the second transmission parameter set; and/or at a time point, updating a start position of the first resource area to an end position of the second resource area.

In an embodiment, the method further includes: according to configuration information of the second transmission parameter set, acquiring a configuration of a third transmission parameter set in the first resource area; or according to the configuration information of the second transmission parameter set and the configuration information of the second transmission parameter set, acquiring the configuration of the third transmission parameter set in the first resource area; where the third transmission parameter set is a set formed by partial or all of same parameter types in the first transmission parameter set and the second transmission parameter set.

In an embodiment, configuration to a parameter type of a same type in the second transmission parameter set is an offset value with respect to the configuration of the parameter type in the first transmission parameter set; and/or in the resource area of an intersected section of the second resource area and the first resource area, receiving a signal by using a first transmission parameter before the second transmission parameter set is obtained.

In an embodiment, the multiple transmission parameter sets satisfy at least one of following characteristics: each transmission parameter set includes a configuration of transmission parameters having the same type; a resource area in which a signal or a channel related to the transmission parameter set is located is a subset of the resource area to which the transmission parameter sets corresponds; the resource area in which the signal or the channel related to the transmission parameter set is located and the resource area to which the transmission parameter sets corresponds are partially overlapped; the multiple transmission parameter sets are notified by multiple control information, the multiple the control information at least includes first control information and second control information; the multiple transmission parameter sets correspond to configuration information of one signal/one channel; an acquisition manner in the multiple transmission parameter sets is different; where the first control information is used for notifying the first transmission parameter set, the second control information is used for notifying the second transmission parameter set, the transmission parameter set is about a related transmission parameter of the signal or the channel.

In an embodiment, the acquisition manner includes: acquiring through RRC control information, acquiring through MAC-CE control information, acquiring through physical layer dynamic control information; acquiring through the first control information; acquiring through the second control information, acquiring through a system message, configuring through a broadcast message, the transmission parameter being an agreed value; acquiring according to an agreed rule; acquiring through dedicated control information; and acquiring through public control information; where the first control information and the second control information belong to control information having a same type, and sending time instants of the first control information and the second control information are different, or each of the first control information and the second control information has an independent CRC check code.

In an embodiment, a resource area in which a signal and/or a channel related to the first transmission parameter set is located is a subset of the first resource area; or the resource area in which the signal and/or the channel related to the first transmission parameter set and the first resource area are different, and are partially overlapped.

According to another embodiment of the present disclosure, a transmission parameter determination method is provided. The method includes: determining a number of parameter configurations X corresponding to a parameter type, where X is a natural number, and there at least exist a first parameter configuration and a first time domain resource area on which a first parameter acts; acquiring a configuration of a parameter type according to a determination result; in a case that the X is greater than 1, there at least exist a second parameter configuration and a second time domain resource area on which a second parameter acts.

In an embodiment, the method includes: determining a value of the X according to the parameter type; and/or receiving control information to determine the value of the X, where the control information includes the value of the X.

In an embodiment, in response to determining that the X is 1, the configuration of the parameter type is determined according to the first parameter configuration; in response to determining that the X is greater than 1, a time domain resource area corresponding to each transmission parameter in the X parameter configurations is determined; at an independent acting section of a time domain resource area, the configuration of the parameter type is determined according to the parameter configuration corresponding to the time domain resource area; at an intersected section of Y time domain resource areas in X time domain resource areas, the configuration of the parameter type is determined according to Y transmission configurations corresponding to the Y time domain resource areas, or the configuration of the parameter type is determined according to one of the Y transmission configurations corresponding to the Y time domain resource areas; where Y is a natural number greater than 1 and less than X.

In an embodiment, the method further includes: according to the parameter type or control information, determining that a configuration manner for the parameter type of the interacted section includes at least one of: manner one: determining the configuration of the parameter type according to the Y transmission configurations corresponding to the Y time domain resource areas; manner two: determining the configuration of the parameter type according to one of the Y transmission configurations corresponding to the Y time domain resource areas.

In an embodiment, the method includes: at the interacted section, determining the configuration of the parameter type according to a parameter configuration having a high priority in the Y parameter configurations.

In an embodiment, the control information at least includes first parameter configuration information.

In an embodiment, the first parameter configuration is configured by higher layer control information, the second parameter configuration is configured by physical layer control information; or the first parameter configuration is configured by RRC control information, the second parameter configuration is configured by MAC CE control information.

In an embodiment, the first time domain resource area corresponding to the first parameter configuration satisfies at least one of following characteristics: receiving all time units included from the first configuration control information starting to the first configuration control information invalidating; receiving partial time units ranging from the first configuration control information starting to the first configuration control information invalidating; receiving all time units included from the first configuration control information starting to the first configuration control information updating; and receiving partial time units ranging from the first configuration control information starting to the first configuration control information updating.

In an embodiment, the second time domain resource area corresponding to the second parameter configuration includes: receiving all time from a first event occurrence time to a configured or agreed closing time; or receiving a time unit group constituted by partial time domain units from the first event occurrence time to the configured or agreed closing time; or receiving all time from the first event occurrence time to a second event occurrence time; or receiving a resource group constituted by partial time domain unit resources from the first event occurrence time to the second event occurrence time.

In an embodiment, a first event is receiving control information which carries the second parameter configuration; and a second event is receiving control information that the second parameter configuration is invalidated or updated.

In an embodiment, the parameter type includes at least one of: a precoding bundling parameter, a Quasi-Co-Location (QCL) relation indication parameter, a resource configuration parameter, a rate matching parameter, a reference signal configuration related parameter, a receiving mode configuration parameter, a transmission technology/mode, a transmission mode, a mapping/interleaving parameter, a sending beam configuration parameter, a modulation order configuration parameter, an encoding rate configuration parameter, a modulation code scheme (MCS) configuration parameter, a number of codewords, a number of transmission layers, a multiple access manner, a resource multiplexing manner, a waveform configuration parameter, a sending power configuration parameter, a numerology parameter, a hybrid automatic repeat request (HARQ) related parameter, a measurement parameter, a feedback parameter and a sending mode.

In an embodiment, the method includes at least one of: according to a configuration of the first parameter configuration, determining a configurable range of parameters having the same type as the first parameter configuration in the second parameter configuration; determining a configurable range of a parameter configuration having a late sending time according to a configurable range of a parameter configuration having an early sending time; determining a number of bits occupied by the second transmission parameter set in a control information notification domain according to the configuration of the first transmission parameter set; where the control information notification domain notifies second transmission parameter set information.

In an embodiment, the first parameter configuration includes multiple subsets, the first time domain resource area includes multiple subareas, the subsets and the subareas are associated; and/or the second parameter configuration includes multiple subsets, the second time domain area set includes multiple subareas, where the subsets and the subareas are associated.

In an embodiment, at a time point, updating partial parameters or all parameters in the first parameter configuration having the same type as that in the second transmission parameter set to the second parameter configuration; and/or at a time point, updating a start position of a first time domain area to an end position of a second time domain area.

In an embodiment, the method further includes: according to configuration information of the second parameter configuration, acquiring a configuration of a third parameter configuration in the first time domain resource area; or according to the configuration information of the second parameter configuration and the configuration information of the second parameter configuration, acquiring the configuration of the third parameter configuration in the first time domain resource area; where the third parameter configuration is a set formed by partial or all of same parameter types in the first transmission parameter set and the second transmission parameter set.

In an embodiment, a configuration to a parameter type of a same type in the second parameter configuration is an offset value with respect to the configuration of the parameter type in the first parameter configuration; and/or in the time domain area before an intersected section of the second time domain area and the first time domain area correspondingly obtains the second parameter configuration, receiving a signal by a first transmission parameter.

In an embodiment, the multiple parameter configurations satisfy at least one of following characteristics: each parameter configuration includes a configuration of transmission parameters having the same type; a time domain area in which a signal or a channel related to the parameter configuration is located is a subset of the time domain resource area to which the parameter configuration corresponds; the time domain resource area in which the signal or the channel related to the parameter configuration is located and the time domain resource area to which the parameter configuration corresponds are partially overlapped; the multiple parameter configurations are notified by multiple control information, the multiple the control information at least includes first control information and second control information; the multiple parameter configurations correspond to configuration information of a signal/a channel; an acquisition manner in the multiple parameter configurations is different; where the first control information is used for notifying the first parameter configuration, the second control information is used for notifying the second parameter configuration, the parameter configuration is a related transmission parameter about the signal.

In an embodiment, the acquisition manner includes: acquiring through RRC control information, acquiring through MAC-CE control information, acquiring through physical layer dynamic control information; acquiring through the first control information; acquiring through the second control information, acquiring a system message, configuring through a broadcast message, the transmission parameter being an agreed value; acquiring according to an agreed rule; acquiring through dedicated control information; and acquiring through public control information; where the first control information and the second control information belong to control information having a same type, and sending times of the first control information and the second control information are different, or each of the first control information and the second control information has an independent CRC check code.

In an embodiment, a time domain area in which a signal and/or a channel related to the first parameter configuration is located is a subset of the first time domain area; or the time domain area in which the signal and/or the channel related to the first parameter configuration and the first time domain area are different, and are partially overlapped.

According to another embodiment of the present disclosure, a transmission parameter determination device is provided. The device includes: a first acquisition module, which is configured to acquire multiple transmission parameter sets, where the multiple transmission parameter sets at least include: a first transmission parameter set, a second transmission parameter set, transmission parameters having a same type; a first determination module, which is configured to determine multiple resource areas, where the multiple resource areas at least include: a first resource area, a second resource area; each resource area includes at least one of: a time domain resource area, a code domain resource area, a frequency domain resource area, a spatial domain resource area, a reference signal resource area; a processing module, which is configured to send information or receive the information on the multiple resource areas according to the multiple transmission parameter sets, which at least includes: sending the information or receiving the information on the first resource area according to the first transmission parameter set; and sending the information or receiving the information on the second resource area according to the second transmission parameter set.

In an embodiment, the processing module includes: a first processing unit, which is configured to at an independent acting section of one resource area, send or receive the information at the independent acting section according to the transmission parameter set corresponding to the resource area; or a second processing unit, which is configured to at an intersected section of N resource areas in the multiple resource areas, send or receive the information at the intersected section according to N transmission parameter sets corresponding to the N resource areas; or a third processing unit, at an intersected section of N resource areas in the multiple resource areas, send or receive the information at the intersected section according to one of the N transmission parameter sets corresponding to the N resource areas; where N is a natural number greater than 1.

According to another embodiment of the present disclosure, a transmission parameter determination device is provided. The device includes: a determination module, which is configured to determine a number of parameter configurations X corresponding to a parameter type, where X is a natural number, and there at least exist a first parameter configuration and a first time domain resource area on which a first parameter acts; a second acquisition module, which is configured to acquire a configuration of a parameter type according to a determination result; a second determination module, which is configured to in a case that the X is greater than 1, determine that there at least exist a second parameter configuration and a second time domain resource area on which a second parameter acts.

According to another embodiment of the present disclosure, a storage medium is further provided. The storage medium is configured to store program codes for executing steps described below.

acquiring multiple transmission parameter sets, where the multiple transmission parameter sets at least include: a first transmission parameter set, a second transmission parameter set, and transmission parameters having a same type;

determining multiple resource areas, where the multiple resource areas at least include: a first resource area, a second resource area; each resource area includes at least one of: a time domain resource area, a code domain resource area, a frequency domain resource area, a spatial domain resource area, a reference signal resource area;

sending information or receiving the information on the multiple resource areas according to the multiple transmission parameter sets, which at least includes: sending the information or receiving the information on the first resource area according to the first transmission parameter set; and sending the information or receiving the information on the second resource area according to the second transmission parameter set.

In an embodiment, the storage medium is further configured to store program codes for executing the following steps:

determining a number of parameter configurations X corresponding to a parameter type, where X is a natural number, and there at least exist a first parameter configuration and a first time domain resource area on which a first parameter acts; acquiring a configuration of a parameter type according to a determination result; in a case that the X is greater than 1, there at least exist a second parameter configuration and a second time domain resource area on which a second parameter acts.

Through the present disclosure, multiple transmission parameter sets are acquired, where the multiple transmission parameter sets at least include: a first transmission parameter set, a second transmission parameter set, transmission parameters having a same type. Multiple resource areas are determined, where the multiple resource areas at least include: a first resource area, a second resource area; the multiple resource areas include at least one of: a time domain resource area, a code domain resource area, a spatial domain resource area, a reference signal resource area. Information is sent or received on the multiple resource areas according to the multiple transmission parameter sets, which at least includes: sending the information or receiving the information on the first resource area according to the first transmission parameter set; and sending the information or receiving the information on the second resource area according to the second transmission parameter set. That is, in the present disclosure, through pre-configured or agreed (through higher layer control information or previous physical layer dynamic control information) data/control/parameter signal transmission parameter information, the terminal is enabled to process the data/control/parameter signal based on the pre-configured transmission parameter before more dynamic control information is not acquired, solving the problem in the exiting art of a low modulation data rate at a receiving end, thereby implementing accelerating the processing capability of the terminal and reducing the control information overhead.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure in any improper way. In the drawings.

DETAILED DESCRIPTION

Hereinafter the present disclosure will be described in detail with reference to the drawings and in conjunction with embodiments. It is to be noted that if not in collision, the embodiments and features therein in the present disclosure may be combined with each other.

It is to be noted that the terms "first", "second" and the like in the description, claims and above drawings of the present disclosure are used to distinguish between similar objects and are not necessarily used to describe a particular order or sequence.

Embodiment One

Figure 1:
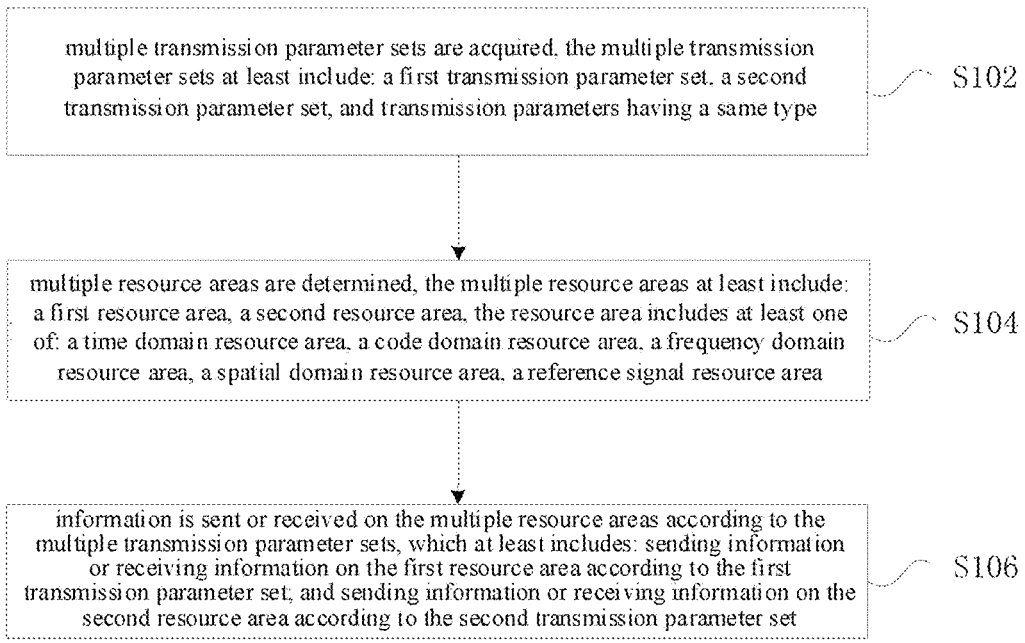
FIG. 1 is a flowchart of a transmission parameter determination method according to an embodiment of the present disclosure.

An embodiment provides a transmission parameter determination method. FIG. 1 is a flowchart of a transmission parameter determination method according to the embodiment of the present disclosure. As shown in FIG. 1, the process includes the steps described below.

In step S102, multiple transmission parameter sets are acquired. The multiple transmission parameter sets at least include: a first transmission parameter set, a second transmission parameter set, and transmission parameters having a same type.

In step S104, multiple resource areas are determined. The multiple resource areas at least include: a first resource area, a second resource area. The resource area includes at least one of: a time domain resource area, a code domain resource area, a frequency domain resource area, a spatial domain resource area, a reference signal resource area.

In step S106, information is sent or received on the multiple resource areas according to the multiple transmission parameter sets, which at least includes: sending information or receiving information on the first resource area according to the first transmission parameter set; and sending information or receiving information on the second resource area according to the second transmission parameter set.

In an embodiment, through pre-configured or agreed (through higher layer control information or previous physical layer dynamic control information) transmission parameter information of data/control/parameter signal, the terminal is enabled to process the data/control/parameter signal based on the pre-configured transmission parameter before acquiring more dynamic control information, solving the problem in the exiting art of a low modulation data rate at a receiving end, thereby accelerating the processing capability of the terminal and reducing the control information overhead.

In an optional embodiment, sending the information or receiving the information on the multiple resource areas according to the multiple transmission parameter sets includes: at an independent acting section of one resource area, sending or receiving the information at the independent acting section according to the transmission parameter set corresponding to the resource area; or at an intersected section of N resource areas in the multiple resource areas, sending or receiving the information at the intersected section according to N transmission parameter sets corresponding to the N resource areas; or at an intersected section of N resource areas in the multiple resource areas, sending or receiving the information at the intersected section according to one of the N transmission parameter sets corresponding to the N resource areas; or where N is a natural number greater than 1.

It is to be noted that the above independent acting section of one resource area is a section, in the above resource area, having no intersection with any one of M resource areas.

In an embodiment, according to a transmission parameter type or indication information, it is determined to adopt at least one of the following manners to process information at an intersected section of N resource areas in the multiple resource areas:

Manner one: to send or receive the information at the intersected section according to a combination of multiple transmission parameter sets in N transmission parameter sets; and Manner two: the information is sent or received at the intersected section according to one of the N transmission parameter sets.

It is to be noted that N is a natural number greater than 1.

In an optional embodiment, a division mode of the multiple resource areas includes, but is not limited to, at least one of: dividing according to a time instant acquiring control information; receiving the control information to determine division of the multiple resource areas, where the control information includes division information of the multiple resource areas; determining the division of the multiple resource areas according to an area where the control information carrying the transmission parameter set acts; and determining the division of the multiple resource areas according to a rule agreed by a receiving end and a sending end. Here, the acquiring the control information includes: decoding the control information.

In an embodiment, the multiple resource areas are divided according to at least one parameter of the following: a transmission parameter type, a channel type, a signal type, a service type, a transceiver antenna configuration, a structure type of a time domain resource unit to which the resource areas belong, a Numerology configuration of the resource area, a transmission mode/a transmission technology/a transmission manner used when transmitting at the resource area, an information type transmitted in the resource area, or a transmission direction.

The transmission parameters having the same type include one or more of the following: a precoding bundling parameter, a Quasi-Co-Location (QCL) relation indication parameter, a resource configuration parameter, a rate matching parameter, a reference signal configuration related parameter, a receiving mode configuration parameter, a transmission technology/mode, a transmission mode, a mapping/interleaving parameter, a sending beam configuration parameter, a modulation order configuration parameter, an encoding rate configuration parameter, a modulation code scheme (MCS) configuration parameter, a number of codewords, a number of transmission layers, a multiple access manner, a resource multiplexing manner, a waveform configuration parameter, a sending power configuration parameter, a numerology parameter, a hybrid automatic repeat request (HARQ) related parameter, a measurement parameter, a feedback parameter and a sending mode.

In an implementation of the embodiment, the second resource area is a subset of the first resource area; an intersection set between the second resource area and the first resource area is empty; the intersection set between the second resource area and the first resource area is non-empty, and the second resource area and the first resource area do not overlap; the first resource area and the second resource area are same; or the first resource area is changed according to the second resource area.

A determination manner of values of partial parameters or all parameters included in the first transmission parameter set includes at least one of: determining according to a previously configured transmission parameter set, determining according to radio resource control (RRC) configuration signaling, determining according to medium access control (MAC) configuration signaling, determining according to system information block (SIB) message, determining according to a physical broadcast channel (PBCH) message, determining according to common control information, determining according to a previous agreement of a sending end and a receiving end. Partial parameters or all parameters included in the second transmission parameter set are determined according to information transmitted in the first resource area. In the second transmission parameter set, there exists at least one type of parameters which correspond to a candidate configuration set A, and parameters having the same type in the first transmission parameter set correspond to a candidate configuration set a; where the A is a set constituted by configurable states, the a is a true subset of the A or the A is a true subset of the a.

In an optional implementation, the embodiment satisfies at least one of following characteristics: according to a configuration of the first transmission parameter set, determining a configurable range of parameters having the same type as the first transmission parameter set in the second transmission parameter set; determining a configurable range of a transmission parameter set having a late sending time instant according to a configurable range of a transmission parameter set having an early sending time instant; determining a number of bits occupied by the second transmission parameter set in a control information notification domain according to the configuration of the first transmission parameter set; where the control information notification domain notifies second transmission parameter set information.

In an implementation, the first transmission parameter set includes multiple subsets, the first resource area includes multiple subareas, the subsets and the subareas are associated; and/or the second transmission parameter set includes multiple subsets, the second resource area includes multiple subareas, where the subsets and the subareas are associated.

In an embodiment, the method further includes: at a time point, updating partial parameters or all parameters in the first transmission parameter set having an identical type as that in the second transmission parameter set to the second transmission parameter set; and/or at a time point, updating a start position of the first resource area to an end position of the second resource area.

In the embodiment, the method further includes: according to configuration information of the second transmission parameter set, acquiring a configuration of a third transmission parameter set in the first resource area; or according to the configuration information of the second transmission parameter set and the configuration information of the second transmission parameter set, acquiring the configuration of the third transmission parameter set in the first resource area; where the third transmission parameter set is a set formed by partial or all of same parameter types in the first transmission parameter set and the second transmission parameter set.

Configuration to a parameter type of a same type in the second transmission parameter set is an offset value with respect to the configuration of the parameter type in the first transmission parameter set; and/or in the resource area of an intersected section of the second resource area and the first resource area, receiving a signal by using a first transmission parameter before the second transmission parameter set is obtained.

In an embodiment, the multiple transmission parameter sets satisfy at least one of following characteristics: each transmission parameter set includes a configuration of the transmission parameters having the same type; a resource area in which a signal or a channel related to the transmission parameter set is located is a subset of the resource area to which the transmission parameter set corresponds; the resource area in which the signal or the channel related to the transmission parameter set is located and the resource area to which the transmission parameter set corresponds are partially overlapped; the multiple transmission parameter sets are notified by multiple pieces of control information, the multiple pieces of control information at least include first control information and second control information; the multiple transmission parameter sets correspond to configuration information of one signal/one channel; or acquisition manners of the multiple transmission parameter sets are different; where the first control information is used for notifying the first transmission parameter set, the second control information is used for notifying the second transmission parameter set, the transmission parameter set is about a transmission parameter of the signal or the channel.

It is to be noted that different control information satisfies at least one of the following: types corresponding to different control information are the same; the types corresponding to different control information are the same, but sending time instants are different, or time units in which the control information is located are the same; different control information corresponds to respective and independent CRC check information.

The channel or signal is a signal or channel allocated to a communication node in one time unit.

The channel or signal corresponds to a portion of time-frequency resource allocation control information.

In an optional embodiment, the different acquisition manners include: acquiring through RRC control information, acquiring through MAC-CE control information, acquiring through physical layer dynamic control information; acquiring through the first control information; acquiring through the second control information, acquiring through a system message, configuring through a broadcast message, the transmission parameter being an agreed value; acquiring according to an agreed rule; acquiring through dedicated control information; and acquiring through public control information; where the first control information and the second control information belong to control information having a same type, and sending times of the first control information and the second control information are different, or each of the first control information and the second control information has an independent CRC check code.

It is to be noted that the control information types include: higher layer control information (such as RRC control information, MAC-CE control information) and physical layer dynamic control information (such as PDCCH).

In an optional embodiment, a resource area in which a signal and/or a channel related to the first transmission parameter set is located is a subset of the first resource area; or the resource area in which the signal and/or the channel related to the first transmission parameter set and the first resource area are different, and are partially overlapped.

Figure 2:
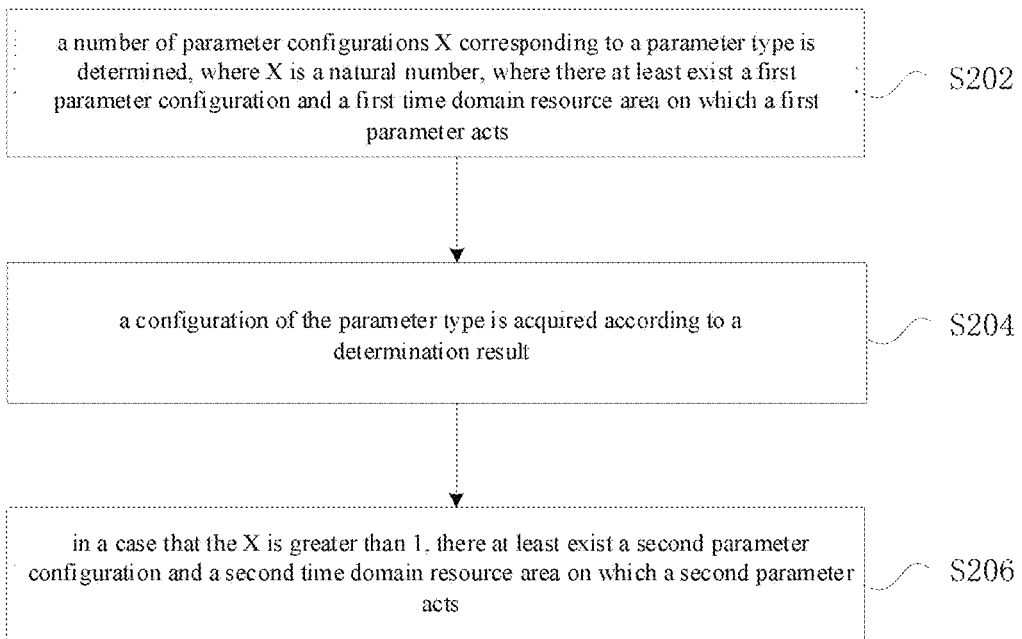
FIG. 2 is a flowchart of another transmission parameter determination method according to an embodiment of the present disclosure.

The embodiment further provides a transmission parameter determination method. FIG. 2 is a flowchart of a transmission parameter determination method according to the embodiment of the present disclosure. As shown in FIG. 2, the process includes the steps described below.

In step S202, a number of parameter configurations X corresponding to a parameter type is determined, where X is a natural number, where there at least exist a first parameter configuration and a first time domain resource area on which a first parameter acts.

In step S204, a configuration of the parameter type is acquired according to a determination result.

In step S206, in a case that the X is greater than 1, there at least exist a second parameter configuration and a second time domain resource area on which a second parameter acts.

In the embodiment, requirements of another channel/signal or a more dynamic resource scheduling are considered. Therefore, combining transmission parameter configuration information included in the more dynamic control information and acquiring the configuration of the transmission parameter solves the problem in the exiting art of a low modulation data rate at a receiving end, thereby implementing accelerating the processing capability of the terminal and reducing the control information overhead.

In an optional embodiment, a value of the X according to the parameter type is determined; and/or control information is received to determine the value of the X, where the control information includes the value of the X.

In response to determining that the X is 1, determining the configuration of the parameter type according to the first parameter configuration; in response to determining that the X is greater than 1, determining a time domain resource area corresponding to each transmission parameter in the X parameter configurations; at an independent acting section of one time domain resource area, determining the configuration of the parameter type according to the parameter configuration corresponding to the time domain resource area; at an intersected section of Y time domain resource areas in X time domain resource areas, determining the configuration of the parameter type according to Y transmission configurations corresponding to the Y time domain resource areas, or determining the configuration of the parameter type according to one of the Y transmission configurations corresponding to the Y time domain resource areas; where Y is a natural number greater than 1 and less than X.

It is to be noted that the independent acting section of the time domain resource area is a section the above resource area having no intersection with any one of M resource areas.

In an embodiment, in the embodiment, it may determine that according to the parameter type or control information, a configuration manner for the parameter type of the interacted section includes at least one of:

manner one: determining the configuration of the parameter type according to the Y transmission configurations corresponding to the Y time domain resource areas; or manner two: determining the configuration of the parameter type according to one of the Y transmission configurations corresponding to the Y time domain resource areas.

At the interacted section, the configuration of the parameter type is determined according to a parameter configuration having a high priority in the Y parameter configurations.

In an embodiment, the control information at least further includes first parameter configuration information. The first parameter configuration is configured by higher layer control information, the second parameter configuration is configured by physical layer control information; or the first parameter configuration is configured by RRC control information, the second parameter configuration is configured by MAC CE control information.

It is to be noted that, in the embodiment, the higher layer configuration information includes: the RRC control information, or the MAC CE control information.

In an optional embodiment, the first time domain resource area corresponding to the first parameter configuration satisfies one of following characteristics: receiving all time units included from the first configuration control information starting to the first configuration control information invalidating; receiving partial time units ranging from the first configuration control information starting to the first configuration control information invalidating; receiving all time units included from the first configuration control information starting to the first configuration control information updating; and receiving partial time units ranging from the first configuration control information starting to the first configuration control information updating.

For example, a time unit satisfying a certain periodicity in the range, or the time unit includes one of transmission directions, or a set formed by time units of the received physical layer dynamic control information in the range.

In an embodiment, the second time domain resource area corresponding to the second parameter configuration includes: receiving all time from a first event occurrence time to a configured or agreed closing time; or receiving a time unit group constituted by partial time domain units from the first event occurrence time to the configured or agreed closing time; or receiving all time from the first event occurrence time to a second event occurrence time; or receiving a resource group constituted by partial time domain unit resources from the first event occurrence time to the second event occurrence time.

A first event is receiving control information which carries the second parameter configuration; a second event is receiving control information that the second parameter configuration is invalidated or updated.

In an embodiment, the parameter type includes at least one of: a precoding bundling parameter, a Quasi-Co-Location (QCL) relation indication parameter, a resource configuration parameter, a rate matching parameter, a reference signal configuration related parameter, a receiving mode configuration parameter, a transmission technology/mode, a transmission mode, a mapping/interleaving parameter, a sending beam configuration parameter, a modulation order configuration parameter, an encoding rate configuration parameter, a modulation code scheme (MCS) configuration parameter, a number of codewords, a number of transmission layers, a multiple access manner, a resource multiplexing manner, a waveform configuration parameter, a sending power configuration parameter, a numerology parameter, a hybrid automatic repeat request (HARQ) related parameter, a measurement parameter, or a feedback parameter.

In the embodiment, according to a configuration of the first parameter configuration, a configurable range of parameters having an identical type as the first parameter configuration in the second parameter configuration may be determined; a configurable range of a parameter configuration having a late sending time instant is determined according to a configurable range of a parameter configuration having an early sending time instant; or a number of bits occupied by the second transmission parameter set in a control information notification domain is determined according to the configuration of the first transmission parameter set. The control information notification domain notifies second transmission parameter set information.

The first parameter configuration includes multiple subsets, the first time domain resource area includes multiple subareas, the subsets and the subareas are associated; and/or the second parameter configuration includes a multiple subsets, the second time domain area set includes multiple subareas, where the subsets and the subareas are associated.

At a time point, partial parameters or all parameters in the first parameter configuration having an identical type as that in the second transmission parameter set are updated to the second parameter configuration; and/or at a time point, a start position of a first time domain area is updated to an end position of a second time domain area.

In an optional embodiment, according to configuration information of the second parameter configuration, a configuration of a third parameter configuration in the first time domain resource area is acquired; or according to the configuration information of the second parameter configuration and the configuration information of the second parameter configuration, the configuration of the third parameter configuration in the first time domain resource area is acquired; where the third parameter configuration is partial parameter types having the same type, or a set constituted by all parameter types having the same type included in the first parameter configuration and the second parameter configuration of the third parameter configuration.

A configuration of a parameter type of a same type in the second parameter configuration is an offset value with respect to a configuration of the parameter type in the first parameter configuration; and/or in the time domain area of an intersected section of the second time domain area and the first time domain area, a signal is received by using a first transmission parameter before the second parameter configuration is obtained.

The multiple parameter configurations satisfy at least one of following characteristics: each parameter configuration includes a configuration of transmission parameters having the same type; a time domain area in which a signal or a channel related to the parameter configuration is located is a subset of the time domain resource area to which the parameter configuration corresponds; the time domain resource area in which the signal or the channel related to the parameter configuration is located and the time domain resource area to which the parameter configuration corresponds are partially overlapped; the multiple parameter configurations are notified by multiple pieces of control information, the multiple pieces of control information at least include first control information and second control information; the multiple parameter configurations correspond to configuration information of one signal/one channel; acquisition manners of the multiple parameter configurations are different; where the first control information is used for notifying the first parameter configuration, the second control information is used for notifying the second parameter configuration, the parameter configuration is about a related transmission parameter of the signal.

It is to be noted that different control information satisfies at least one of the following: types corresponding to different control information are the same; the types corresponding to different control information are the same, but sending time instants are different, or time units in which the control information is located are the same; or different control information corresponds to respective and independent CRC check information.

The channel or signal is a signal or channel allocated to a communication node in one time unit. The channel or signal corresponds to a portion of time-frequency resource allocation control information.

In an embodiment, the different acquisition manners include: acquiring through RRC control information, acquiring through MAC-CE control information, acquiring through physical layer dynamic control information; acquiring through the first control information; acquiring through the second control information, acquiring a system message, configuring through a broadcast message, the transmission parameter being an agreed value; acquiring according to an agreed rule; acquiring through dedicated control information; and acquiring through public control information; where the first control information and the second control information belong to control information having a same type, and sending times of the first control information and the second control information are different, or each of the first control information and the second control information has an independent CRC check code.

A time domain area in which a signal and/or a channel related to the first parameter configuration is located is a subset of the first time domain area; or the time domain area in which the signal and/or the channel related to the first parameter configuration and the first time domain area are different, and are partially overlapped.

From the description of the embodiments described above, it will be apparent to those skilled in the art that the method in the embodiments described above may be implemented by software plus a necessary general-purpose hardware platform, or may of course be implemented by hardware. However, in many cases, the former is a preferred implementation mode. Based on this understanding, the solution provided by the present disclosure substantially, or the part contributing to the related art, may be embodied in the form of a software product. The computer software product is stored in a storage medium (such as a read-only memory (ROM)/a random access memory (RAM), a magnetic disk or an optical disk) and includes several instructions for enabling a terminal device (which may be a mobile phone, a computer, a server, a network device or the like) to execute the method according to each embodiment of the present disclosure.

Embodiment Two

A transmission parameter determination device is provided in the embodiment. The device is used for implementing the above-mentioned embodiments and preferred embodiments. What has been described will not be repeated. As used below, the term "module" may be software, hardware or a combination thereof capable of implementing predetermined functions. The device in the embodiments described below is preferably implemented by software, but implementation by hardware or by a combination of software and hardware is also possible and conceived.

Figure 3:
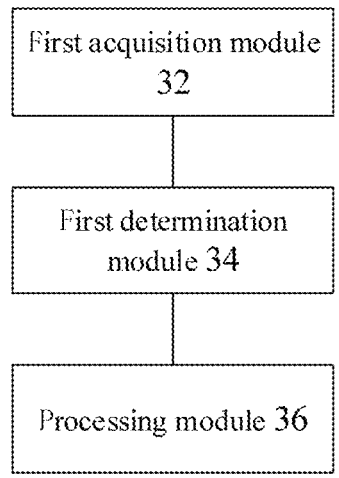
FIG. 3 is a structural block diagram of a transmission parameter determination device according to an embodiment of the present disclosure.

FIG. 3 is a structural block diagram of a transmission parameter determination device according to an embodiment of the present disclosure. As shown in FIG. 3, the device includes the modules described below.

A first acquisition module 32 is configured to acquire a multiple transmission parameter sets, where the multiple transmission parameter sets at least include: a first transmission parameter set, a second transmission parameter set, and transmission parameters having a same type.

A first determination module 34 is configured to determine multiple resource areas, where the multiple resource areas at least include: a first resource area, a second resource area; each resource area includes at least one of: a time domain resource area, a code domain resource area, a frequency domain resource area, a spatial domain resource area, a reference signal resource area.

A processing module 36 is configured to send information or receive information on the multiple resource areas according to the multiple transmission parameter sets, which at least includes: sending information or receiving information on the first resource area according to the first transmission parameter set; and sending information or receiving information on the second resource area according to the second transmission parameter set.

In an optional embodiment, the processing module 36 includes: a first processing unit, which is configured to at an independent acting section of one resource area, send or receive the information at the independent acting section according to the transmission parameter set corresponding to the resource area; or a second processing unit, which is configured to at an intersected section of N resource areas in the multiple resource areas, send or receive the information at the intersected section according to N transmission parameter sets corresponding to the N resource areas; or a third processing unit, at an intersected section of N resource areas in the multiple resource areas, send or receive the information at the intersected section according to one of the N transmission parameter sets corresponding to the N resource areas; where N is a natural number greater than 1.

In an embodiment, a division mode of the multiple resource areas includes at least one of: dividing according to a time instant acquiring control information; receiving the control information to determine division of the multiple resource areas, where the control information includes division information of the multiple resource areas; determining the division of the multiple resource areas according to an area where the control information carrying the transmission parameter set acts; and determining the division of the multiple resource areas according to a rule agreed by a receiving end and a sending end.

In an embodiment, the multiple resource areas are divided according to at least one of: a transmission parameter type, a channel type, a signal type, a service type, a transceiver antenna configuration, a structure type of a time domain resource unit to which the resource areas belong, a Numerology configuration of the resource area, a transmission mode/a transmission technology/a transmission manner when transmitting in the resource area, an information type transmitted in the resource area, or a transmission direction.

In an embodiment, the transmission parameters having the same type include one or more of the following: a precoding bundling parameter, a Quasi-Co-Location (QCL) relation indication parameter, a resource configuration parameter, a rate matching parameter, a reference signal configuration related parameter, a receiving mode configuration parameter, a transmission technology/mode, a transmission mode, a mapping/interleaving parameter, a sending beam configuration parameter, a modulation order configuration parameter, an encoding rate configuration parameter, a modulation code scheme (MCS) configuration parameter, a number of codewords, a number of transmission layers, a multiple access manner, a resource multiplexing manner, a waveform configuration parameter, a sending power configuration parameter, a numerology parameter, a hybrid automatic repeat request (HARQ) related parameter, a measurement parameter, a feedback parameter and a sending mode.

In an embodiment, the second resource area is a subset of the first resource area; an intersection set between the second resource area and the first resource area is empty; the intersection set between the second resource area and the first resource area is non-empty, and the second resource area and the first resource area do not overlap; the first resource area and the second resource area are same; the first resource area is changed according to the second resource area.

In an embodiment, a determination manner of values of partial parameters and all parameters included in the first transmission parameter set includes at least one of: In an embodiment, a determination manner of values of partial parameters and all parameters included in the first transmission parameter set includes at least one of: determining according to a previously configured transmission parameter set, determining according to radio resource control configuration signaling, determining according to medium access control (MAC) configuration signaling, determining according to system information block (SIB) message, determining according to a physical broadcast channel (PBCH) message, determining according to common control information, determining according to a previous agreement of a sending end and a receiving end.

In an embodiment, partial parameters or all parameters included in the second transmission parameter set are determined according to information transmitted in the first resource area.

In an embodiment, in the second transmission parameter set, there exists at least a type of parameters which correspond to a candidate configuration set A, and parameters having the same type in the first transmission parameter set correspond to a candidate configuration set a; where the A is a set constituted by configurable states, the a is a true subset of the A or the A is a true subset of the a.

In an embodiment, the method satisfies at least one of following characteristics: according to a configuration of the first transmission parameter set, determining a configurable range of parameters having the same type as the first transmission parameter set in the second transmission parameter set; determining a configurable range of a transmission parameter set having a late sending time instant according to a configurable range of a transmission parameter set having an early sending time instant; determining a number of bits occupied by the second transmission parameter set in a control information notification domain according to the configuration of the first transmission parameter set; where the control information notification domain notifies second transmission parameter set information. The control information notification domain notifies second transmission parameter set information.

In an embodiment, the first transmission parameter set includes multiple subsets, the first resource area includes multiple subareas, the subsets and the subareas are associated; and/or the second transmission parameter set includes multiple subsets, the second resource area includes multiple subareas, where the subsets and the subareas are associated.

In an embodiment, at a time point, partial parameters or all parameters in the first transmission parameter set having the same type as that in the second transmission parameter set are updated to the second transmission parameter set; and/or at a time point, a start position of the first resource area is updated to an end position of the second resource area.

In an embodiment, the method further includes: according to configuration information of the second transmission parameter set, acquiring a configuration of a third transmission parameter set in the first resource area; or according to the configuration information of the second transmission parameter set and the configuration information of the second transmission parameter set, acquiring the configuration of the third transmission parameter set in the first resource area; where the third transmission parameter set is a set formed by partial or all of same parameter types in the first transmission parameter set and the second transmission parameter set.

In an embodiment, configuration to a parameter type of a same type in the second transmission parameter set is an offset value with respect to the configuration of the parameter type in the first transmission parameter set; and/or in the resource area of an intersected section of the second resource area and the first resource area, receiving a signal by using a first transmission parameter before the second transmission parameter set is obtained.

In an embodiment, the multiple transmission parameter sets satisfy at least one of following characteristics: each transmission parameter set includes a configuration of transmission parameters having the same type; a resource area in which a signal or a channel related to the transmission parameter set is located is a subset of the resource area to which the transmission parameter sets corresponds; the resource area in which the signal or the channel related to the transmission parameter set is located and the resource area to which the transmission parameter sets corresponds are partially overlapped; the multiple transmission parameter sets are notified by multiple control information, the multiple the control information at least includes first control information and second control information; the multiple transmission parameter sets correspond to configuration information of one signal/one channel; or acquisition manners of the multiple transmission parameter sets are different; where the first control information is used for notifying the first transmission parameter set, the second control information is used for notifying the second transmission parameter set, the transmission parameter set is about a related transmission parameter of the signal or the channel.

In an embodiment, the acquisition manner includes: acquiring through RRC control information, acquiring through MAC-CE control information, acquiring through physical layer dynamic control information; acquiring through the first control information; acquiring through the second control information, acquiring through a system message, configuring through a broadcast message, the transmission parameter being an agreed value; acquiring according to an agreed rule; acquiring through dedicated control information; and acquiring through public control information; where the first control information and the second control information belong to control information having a same type, and sending times of the first control information and the second control information are different, or each of the first control information and the second control information has an independent CRC check code.

In an embodiment, a resource area in which a signal and/or a channel related to the first transmission parameter set is located is a subset of the first resource area; or the resource area in which the signal and/or the channel related to the first transmission parameter set and the first resource area are different, and are partially overlapped.

Figure 4:
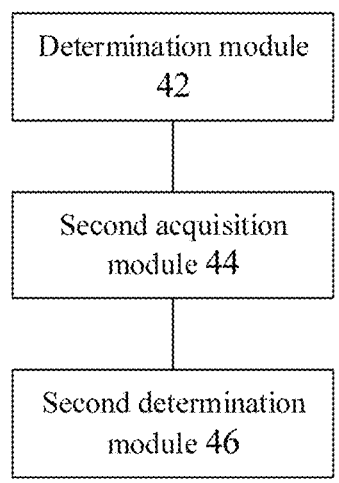
FIG. 4 is a structural block diagram of a transmission parameter determination device according to an embodiment of the present disclosure.

A transmission parameter determination device is further provided in this embodiment. FIG. 4 is a structural block diagram of the transmission parameter determination device according to an embodiment of the present disclosure. As shown in FIG. 4, the device includes:

a determination module 42, which is configured to determine a number of parameter configurations X corresponding to a parameter type, where X is a natural number, and there at least exist a first parameter configuration and a first time domain resource area on which a first parameter acts;

a second acquisition module 44, which is configured to acquire a configuration of a parameter type according to a determination result;

a second determination module 46, which is configured to in a case that the X is greater than 1, determine that there at least exist a second parameter configuration and a second time domain resource area on which a second parameter acts.

In an embodiment, the method includes: determining a value of the X according to the parameter type; and/or receiving control information to determine the value of the X, where the control information includes the value of the X.

In an embodiment, in response to determining that the X is 1, the configuration of the parameter type is determined according to the first parameter configuration; in response to determining that the X is greater than 1, a time domain resource area corresponding to each transmission parameter in the X parameter configurations is determined; at an independent acting section of a time domain resource area, the configuration of the parameter type is determined according to the parameter configuration corresponding to the time domain resource area; at an intersected section of Y time domain resource areas in X time domain resource areas, the configuration of the parameter type is determined according to Y transmission configurations corresponding to the Y time domain resource areas, or the configuration of the parameter type is determined according to one of the Y transmission configurations corresponding to the Y time domain resource areas; where Y is a natural number greater than 1 and less than X.

In an embodiment, the method further includes: according to the parameter type or control information, determining that a configuration manner for the parameter type of the interacted section includes at least one of: manner one: determining the configuration of the parameter type according to the Y transmission configurations corresponding to the Y time domain resource areas; manner two: determining the configuration of the parameter type according to one of the Y transmission configurations corresponding to the Y time domain resource areas.

In an embodiment, the method includes: at the interacted section, determining the configuration of the parameter type according to a parameter configuration having a high priority in the Y parameter configurations.

In an embodiment, the control information at least further includes first parameter configuration information.

In an embodiment, the first parameter configuration is configured by higher layer control information, the second parameter configuration is configured by physical layer control information configuration; or the first parameter configuration is configured by RRC control information, the second parameter configuration is configured by MAC CE control information.

In an embodiment, the first time domain resource area corresponding to the first parameter configuration satisfies at least one of following characteristics: receiving all time units included from the first configuration control information starting to the first configuration control information invalidating; receiving partial time units ranging from the first configuration control information starting to the first configuration control information invalidating; receiving all time units included from the first configuration control information starting to the first configuration control information updating; and receiving partial time units ranging from the first configuration control information starting to the first configuration control information updating.

In an embodiment, the second time domain resource area corresponding to the second parameter configuration includes: receiving all time from a first event occurrence time to a configured or agreed closing time; or receiving a time unit group constituted by partial time domain units from the first event occurrence time to the configured or agreed closing time; or receiving all time from the first event occurrence time to a second event occurrence time; or receiving a resource group constituted by partial time domain unit resources from the first event occurrence time to the second event occurrence time.

In an embodiment, a first event is receiving control information which carries the second parameter configuration; and a second event is receiving control information that the second parameter configuration is invalidated or updated.

In an embodiment, the parameter type includes at least one of: a precoding bundling parameter, a Quasi-Co-Location (QCL) relation indication parameter, a resource configuration parameter, a rate matching parameter, a reference signal configuration related parameter, a receiving mode configuration parameter, a transmission technology/mode, a transmission mode, a mapping/interleaving parameter, a sending beam configuration parameter, a modulation order configuration parameter, an encoding rate configuration parameter, a modulation code scheme (MCS) configuration parameter, a number of codewords, a number of transmission layers, a multiple access manner, a resource multiplexing manner, a waveform configuration parameter, a sending power configuration parameter, a numerology parameter, a hybrid automatic repeat request (HARQ) related parameter, a measurement parameter, a feedback parameter or a sending mode.

In an embodiment, the method includes at least one of: according to a configuration of the first parameter configuration, determining a configurable range of parameters having the same type as the first parameter configuration in the second parameter configuration; determining a configurable range of a parameter configuration having a late sending time according to a configurable range of a parameter configuration having an early sending time; a number of bits occupied by the second transmission parameter set in a control information notification domain is determined according to the configuration of the first transmission parameter set. The control information notification domain notifies second transmission parameter set information.

In an embodiment, the first parameter configuration includes multiple subsets, the first time domain resource area includes multiple subareas, the subsets and the subareas are associated; and/or the second parameter configuration includes multiple subsets, the second time domain area set includes multiple subareas, where the subsets and the subareas are associated.

In an embodiment, at a time point, updating partial parameters or all parameters in the first parameter configuration having an identical type as that in the second transmission parameter set to the second parameter configuration; and/or at a time point, updating a start position of a first time domain area to an end position of a second time domain area.

In an embodiment, the method further includes: according to configuration information of the second parameter configuration, acquiring a configuration of a third parameter configuration in the first time domain resource area; or according to the configuration information of the second parameter configuration and the configuration information of the second parameter configuration, acquiring the configuration of the third parameter configuration in the first time domain resource area; where the third parameter configuration is a set formed by partial or all of same parameter types in the first transmission parameter set and the second transmission parameter set.

In an embodiment, a configuration to a parameter type of a same type in the second parameter configuration is an offset value with respect to the configuration of the parameter type in the first parameter configuration; and/or in the time domain area of an intersected section of the second time domain area and the first time domain area, a signal is received by using a first transmission parameter before the second parameter configuration is obtained.

In an embodiment, the multiple parameter configurations satisfy at least one of following characteristics: each parameter configuration includes a configuration of transmission parameters having the same type; a time domain area in which a signal or a channel related to the parameter configuration is located is a subset of the time domain resource area to which the parameter configuration corresponds; the time domain resource area in which the signal or the channel related to the parameter configuration is located and the time domain resource area to which the parameter configuration corresponds are partially overlapped; the multiple parameter configurations are notified by a multiple control information, the multiple the control information at least includes first control information and second control information; the multiple parameter configurations correspond to configuration information of one signal/one channel; or acquisition manners of the multiple parameter configurations are different; where the first control information is used for notifying the first parameter configuration, the second control information is used for notifying the second parameter configuration, the parameter configuration is about a related transmission parameter of the signal.

In an embodiment, the acquisition manner includes: acquiring through RRC control information, acquiring through MAC-CE control information, acquiring through physical layer dynamic control information; acquiring through the first control information; acquiring through the second control information, acquiring through a system message, configuring through a broadcast message, the transmission parameter being an agreed value; acquiring according to an agreed rule; acquiring through dedicated control information; and acquiring through public control information; where the first control information and the second control information belong to control information having a same type, and sending times of the first control information and the second control information are different, or each of the first control information and the second control information has an independent CRC check code.

In an embodiment, a time domain area in which a signal and/or a channel related to the first parameter configuration is located is a subset of the first time domain area; or the time domain area in which the signal and/or the channel related to the first parameter configuration and the first time domain area are different, and are partially overlapped.

It is to be noted that the various modules described above may be implemented by software or hardware. Implementation by hardware may, but may not necessarily, be performed in the following manners: the various modules described above are located in the same processor, or the various modules described above are located in their respective processors in any combination form.

Embodiment Three

In the embodiment, a first transmission parameter set and a second transmission parameter set both include information having the same type, but time areas (i.e., the above resource area) corresponding to the first transmission parameter set and the second transmission parameter set are different. The time areas corresponding to the first transmission parameter set are different, for example, the first transmission parameter corresponds to a first time area, the second transmission parameter set corresponds to a second time area.

It is to be noted that, in this embodiment, a time window corresponds to the time areas.

Figure 5A:
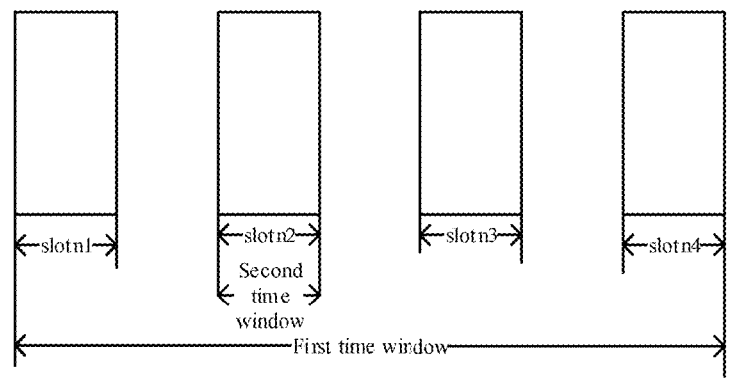
FIGS. 5a to 5e are schematic diagrams of relationships between a first time window and a second time window.
Figure 5B:
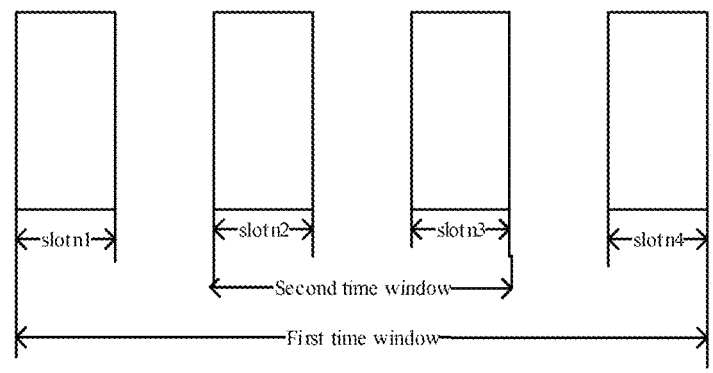

As shown in FIGS. 5a to 5b, the second time area is a subset of the first time area. The first time area includes {slotn5, slotn2, slotn3, slotn4}, the second time area includes{slotn2}, where slotn5 to slotn2 may be time domain consecutive slots or time domain non-consecutive slots. The second time area in FIG. 5 only includes a slot, that the second time area may include more than one slot is not excluded in the embodiment. In FIGS. 5a to 5b, the time unit is slot. That the time unit is a time domain symbol or another time unit is also not exclude in the embodiment. The position number of the first time area and the second time area in FIGS. 5a to 5b is just example, and does not exclude other cases.

Figure 5C:
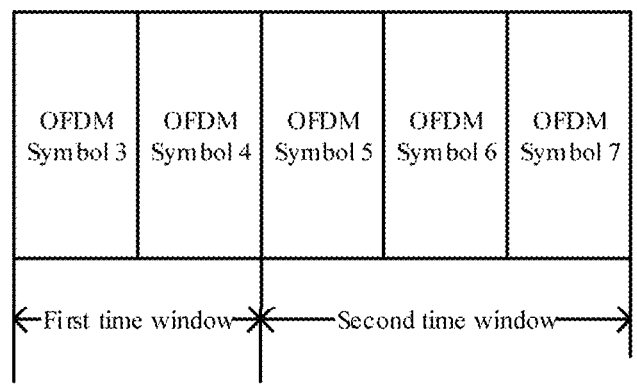
Figure 5D:
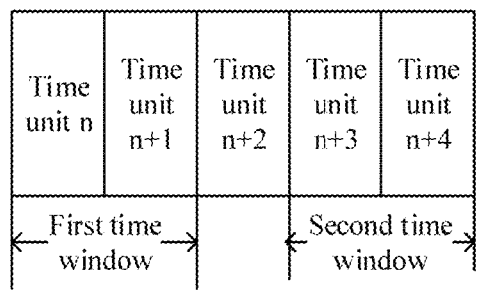

An intersection set between the second resource area and the first resource area may also be empty. As shown in FIGS. 5c to 5d, the time unit in FIGS. 5c to 5d is a time domain OFDM symbol, and of course another time unit type is also not excluded.

Figure 5E:
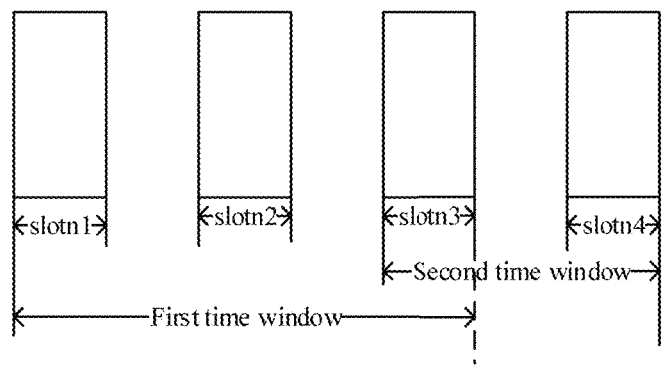

The intersection set between the second resource area and the first resource area may also be non-empty, and not satisfy the subset relationship, i.e., two time areas satisfy being partially overlapped, or being empty. As shown in FIG. 5e, the time unit in FIG. 5e is a slot, and of course another time unit type is also not excluded.

The first time area and the second time area may also be completely same time areas.

In FIGS. 5a to 5e, the relationship between the first time area and the second time area is only an example, and this embodiment does not exclude other relationship cases of the time areas.

As shown in FIGS. 5a to 5b and FIG. 5e, at the intersected section of the two time areas (i.e., the section the two time areas act together), one manner is that the transmission parameter value of the intersected section is determined according to the second transmission parameter set, another manner is that the transmission parameter value of the intersected section is jointly determined according to the second transmission parameter set and the second transmission parameter set, for example, the transmission parameter value is a union of the first transmission parameter set and the second transmission parameter set. In a section that the two time areas not act together, the transmission parameter value is determined according to the transmission parameter corresponding to the transmission area. Specifically, for example, in the time unit of the first time area in addition to the second time area, the transmission parameter value is only determined according to the first transmission resource set, in the time unit of the second time area in addition to the first time area, the transmission parameter is only determined according to the second transmission resource set.

In this embodiment, a resource area is a time area, similarly, in this embodiment, the resource area may be at least one of: a time domain resource area, a code domain resource area, a frequency domain resource area, a spatial resource (antenna/beam) area.

Embodiment Four

This embodiment illustrates division principles for a first resource area and a second resource area.

Figure 6A:
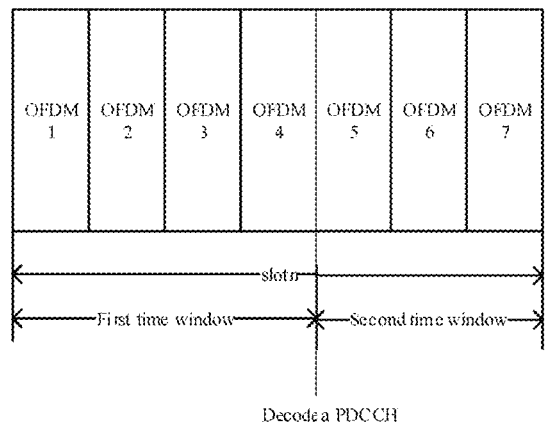
FIGS. 6a to 6b are schematic diagrams of relationships between a first time window and a second time window.

A first type of division principle is to divide according to a time acquiring physical layer/MAC layer/RRC layer control information related to the transmission, for example, a terminal acquires the physical layer control information (such as a PDCCH) in a time unit as a boundary of the two area. As shown in FIG. 6a, in FIG. 6a, a first time window (the first resource area) is a time window before the PDCCH is decoded in one slot, and a second time window (the second resource area) is a time window after the PDCCH is decoded in one slot. The first time window in FIG. 6a may also remove a downlink time domain.

Figure 6B:
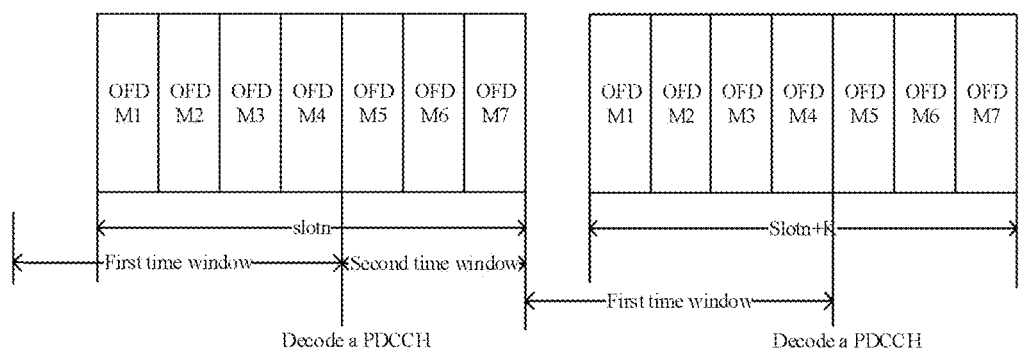

In an embodiment, after one time node, the first transmission parameter set is updated to the previous second transmission parameter set, and a start position of the first time window is updated to a start position of the previous second time window (or an end position of the second time window or any position in the previous second time window). An end position of the first time window is second decoded control information. The control information includes the transmission parameter set or a subset in the transmission parameter set. As shown in FIG. 6b, the second resource area is an area in the slotn after the PDCCH is decoded in the slotn. After the slotn, the start position of the first time window is the end position of the slotn.

The second division principle for the resource area in this embodiment is that the terminal acquires MAC CE control information as a boundary between the first resource area and the second resource area. Preferably, the area in front of the boundary is the first resource area, and the area behind the boundary the second resource area.

The third division principle for the resource area in this embodiment is that the terminal acquiring RRC control information as a boundary between the first resource area and the second resource area. Preferably, the area in front of the boundary is the first resource area, and the area behind the boundary the second resource area.

The fourth division mode for the resource area in this embodiment is to determine the division of the first resource area and the second resource area according to the control information sent by the base station. The control information includes division information of the first resource area and the second resource area. The control information is notified by at least one of: higher layer information (such as RRC control information, MAC CE control information) and physical layer dynamic control information (such as the PDCCH).

The fourth division mode for the resource area in this embodiment is to divide according to an agreed rule, for example, a division boundary of the first resource area and the second resource area is agreed to be a Kth time domain symbol of one slot. Or the boundary is agreed to be the end position of the downlink control domain. For example, a blind detection range of the PDCCH is first six time domain symbols of one slot, and the terminal detects that all DCI in the current time unit are on the first time domain symbol, and the second time domain symbol is taken as the boundary.

The sixth implementation mode in this embodiment is to obtain the resource area according to a time area notifying the control information of the transmission parameter set configuration information of action. Specifically, for example, the first resource area satisfies the following characteristics: the terminal receives all time units included from the first configuration control information starting to the first configuration control information failing; the terminal receives partial time units ranging from the first configuration control information starting to the first configuration control information failing; the terminal receives all time units included from the first configuration control information starting to the first configuration control information updating; and the terminal receives partial time units ranging from the first configuration control information starting to the first configuration control information updating, such as a time unit that satisfies a predetermined rule within the above range, such as a time unit in a predetermined period within the above range, or the time unit includes one of transmission directions. The second resource area satisfies at least one of the following characteristics: receiving all time from a first event occurrence time to a configuration or agreed closing time; receiving a time unit group constituted by partial time domain units from the first event occurrence time to the configuration or agreed closing time; receiving all time from the first event occurrence time to a second event occurrence time; receiving a resource group constituted by partial time domain unit resources from the first event occurrence time to the second event occurrence time. A first event is control information receiving the second parameter configuration; a second event is control information receiving the second parameter configuration invalidating or updating. Specifically, for example, the first configuration control information is the higher layer configuration information, and the second parameter configuration control information is the physical layer dynamic control information.

In the seventh implementation mode of this embodiment, the division for the resource area is determined according to the parameter type. The parameter type is different, and then the resource regions are divided differently.

Embodiment Five

In this embodiment, a base station transmits higher layer control information to a terminal, the higher layer control information (i.e., the above first parameter configuration control information) includes demodulation reference signal information (i.e., the above first parameter configuration) of the terminal. The demodulation reference signal information includes at least one of: demodulation reference signal port set information, demodulation reference signal port number information, a frequency domain resource corresponding to a demodulation reference signal port set, and a frequency domain first precoding granularity unit corresponding to the demodulation reference signal port set.

Figure 7A:
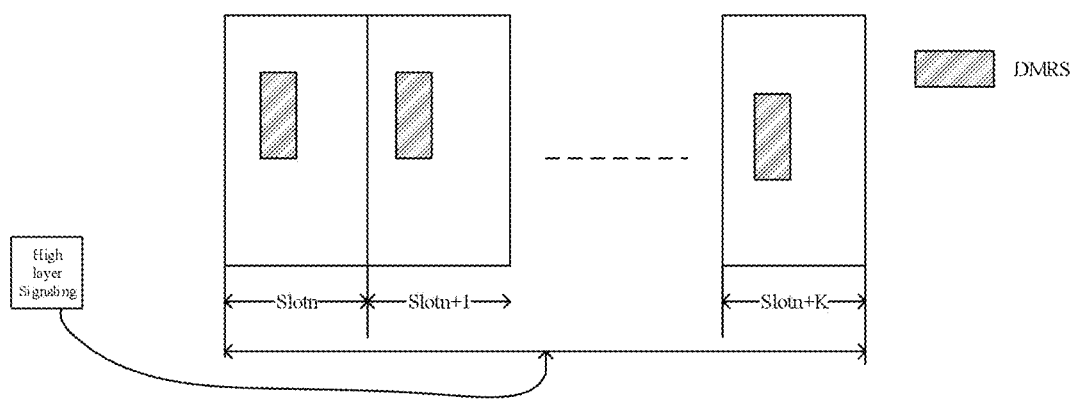
FIG. 7a is a diagram of a frequency domain resource occupied in each time unit by a demodulation reference signal and a time domain area corresponding to higher layer control signaling.

As shown in FIG. 7a, the higher layer control information corresponds to slotn~slotn+K (i.e., a first time domain range), and on the slotn~slotn+K, the terminal may perform channel estimation based on the notified demodulation reference information.

Figure 7B:
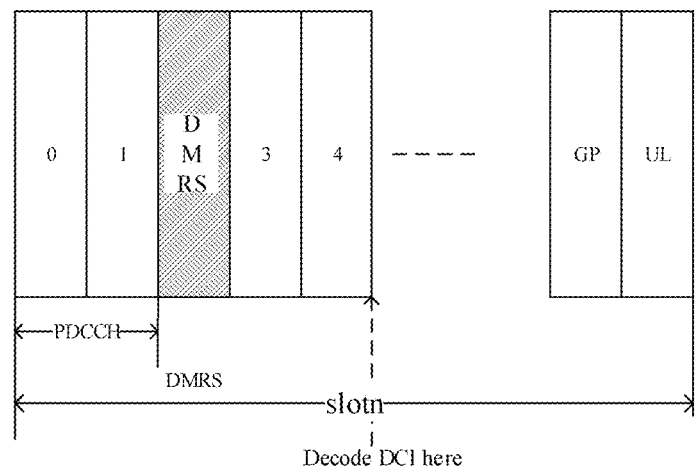
FIGS. 7b to 7d are diagrams of a frequency domain resource occupied by a demodulation reference signal.

In this way, the terminal may perform the channel estimation in any one of slots among each slotn~slotn+K before decoding downlink control information (such as a PDCCH), thereby accelerating a data demodulation rate. For example, as shown in FIG. 7b, if the terminal needs to be after a symbol 4 to decode downlink physical layer dynamic control information DCI, and a demodulation reference signal is sent on a time domain symbol 2, if no higher layer control information is provided for notification, the terminal may perform the channel estimation after the symbol 4. And if the higher layer control information is provided for notification, the terminal may perform the channel estimation before decoding the symbol 4, and after the DCI is decoded at the symbol 4, the slot having scheduling data of the terminal is obtained, the terminal may continue data demodulation by using the channel estimation which had been prepared well. When the DCI is decoded and the slot not having scheduling data of the terminal is learned, the terminal terminates the data demodulation of the slot and waits for a next slot.

It can be seen from the above description that since the demodulation reference signal port information is pre-configured by the higher layer control information, so that the terminal may perform the channel estimation in advance before dynamic scheduling information is obtained, and the data processing process is accelerated.

Figure 7C:
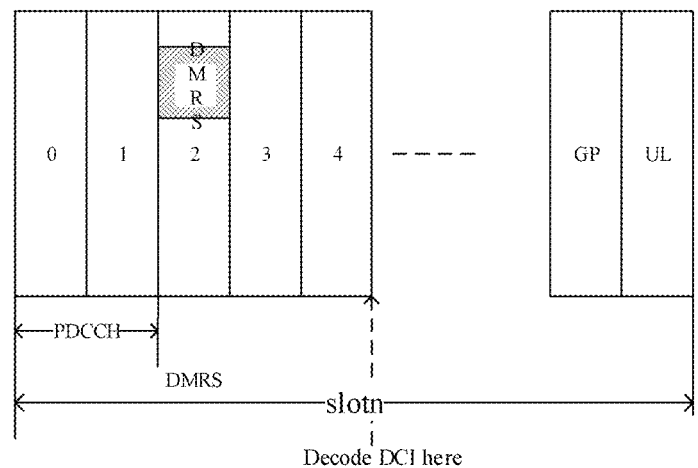

In the above solution, when the higher layer notifies the terminal of the demodulation reference signal port information, the higher layer also needs to inform the terminal of a frequency domain resource occupied by the demodulation reference signal. As shown in FIG. 7b, it is agreed that the frequency domain resource occupied by the demodulation reference signal is a system bandwidth allocated to the terminal, and of course, it is not excluded to agree that the frequency domain resource occupied by the demodulation reference signal is other cases. As shown in FIG. 7c, it is agreed that the frequency domain resource occupied by the demodulation reference signal is a frequency domain occupied by data latest (i.e., in scheduling closest to the current time unit, which is scheduling of a time unit before the current time unit) allocated to the terminal. A second mode is to notify the frequency domain resource occupied by the demodulation reference signal in the higher layer control information.

Figure 7D:
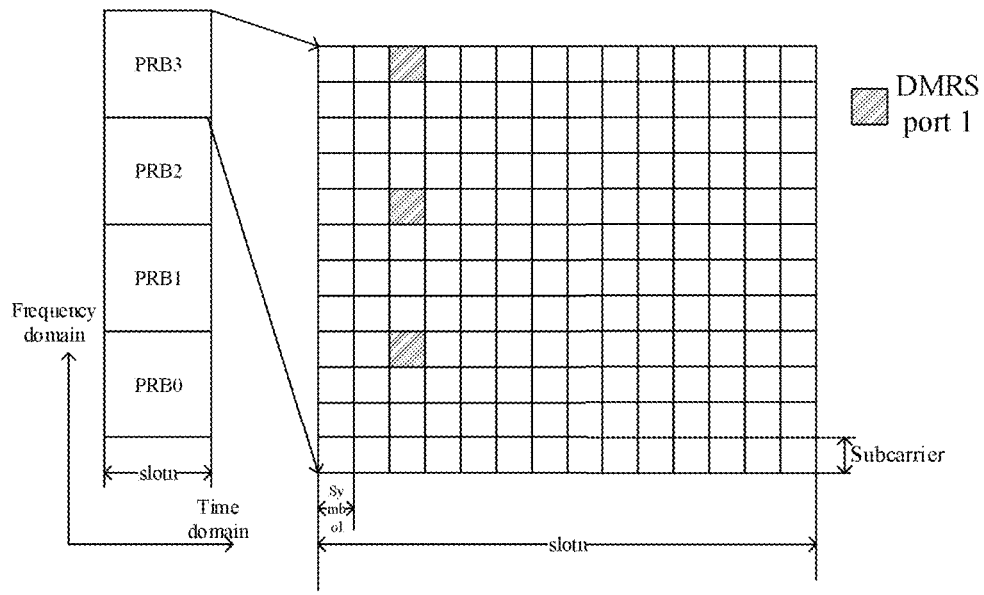

In FIGS. 7b to 7c, the demodulation reference signal continuously fully occupies the frequency domain resource occupied by the demodulation reference signal. Of course, this embodiment does not exclude that the frequency domain resource occupied by the demodulation reference signal is a physical resource block resource occupied by the demodulation reference signal, and in each physical resource block, the demodulation reference signal occupies a part of subcarriers. As shown in FIG. 7d, it is assumed that the system bandwidth allocated to the terminal is four PRBs, and a subcarrier pattern occupied by a demodulation reference signal port 1 in each PRB is as shown in FIG. 7d, in this case, the frequency domain resource corresponding to the demodulation reference signal is one or more PRB resources in the four PRBs. For example the frequency domain resource corresponding to the demodulation reference signal is PRB2~PRB3.

Before the terminal obtains dynamic DCI, firstly, the channel estimation is performed on the demodulation reference signal port 1 on the PRB2~PRB3. When the data of the terminal is found on the PRB2 through the DCI, the terminal uses a channel estimation value obtained on the PRB2 to continue the data demodulation. When the data of the terminal is obtained by the DCI on the PRB1~PRB3, the terminal may demodulate data on the PRB2~PRB3 by using the channel estimation value obtained on the PRB2~PRB3, continue to obtain the channel estimation of the demodulation reference signal port 1 on the PRB1 and then perform the data demodulation on the PRB1. Of course this embodiment does not exclude that the scheduling data of the terminal is not on PRB2~PRB3. In this case, the terminal discards the channel estimation value obtained on the PRB2~PRB3, and performs the channel estimation on the PRB in which the scheduling data of the terminal is located. That is, in this case, one demodulation reference signal port corresponds to two frequency domain resources, one is a frequency domain resource when the channel estimation is performed based on information notified by the higher layer control information, one is a frequency domain resource known according to the dynamic control information, i.e., a frequency domain resource actually sent by the demodulation reference signal.

In summary, one demodulation reference signal port corresponds to two frequency domain resources. Of course this embodiment does not exclude that one demodulation reference signal only corresponds to one frequency domain resource, i.e., the frequency domain resource when the channel estimation is performed based on the information notified by the higher layer control information is the same with the frequency domain resource actually sent by the demodulation reference signal. In this case, it is to be noted that when the terminal performs the channel estimation according to the information notified by the higher layer control information, a PRB bundling parameter needs to be know because when the channel estimation is performed according to the higher layer control information, a case in which data scheduling the terminal actually is not on some frequency domains exists. Preferably, a frequency domain Bundling (which is referred to a first frequency domain precoding granularity unit) of the demodulation reference signal notified by the higher layer control information should be a subset of a Bundling (which is referred to a second frequency domain precoding granularity unit) of the demodulation reference signal in the current time unit of the terminal, or the first precoding granularity unit is less than the second frequency domain precoding granularity unit. Preferably, the first frequency domain precoding granularity unit is agreed to be a PRB, and the Bundling of the actual demodulation reference signal in the current time unit of the terminal, i.e., the second frequency domain precoding granularity unit, may adopt a magnitude notified by using he system bandwidth or the control information allocated to the terminal. As shown in FIG. 7d, when the channel estimation is performed based on the higher layer control information, the terminal assumes that the magnitude of the first frequency domain precoding granularity unit of the demodulation reference signal is one PRB, and the channel estimation obtained by the terminal on the PRB2 and the PRB3 cannot be joint channel estimation. When the terminal scheduling data of the current slot occupies the PRB2~PRB3 according to the dynamic control information, the second frequency domain precoding granularity unit includes 2 PRBs, and according to an agreed rule (for example, a similar method in the LTE may be adopted, the PRB bundling unit may be divided according to the system bandwidth), in this case, the PRB2~PRB3 are in one PRB bundling unit, the terminal may perform the joint channel estimation on the channel estimation obtained on the PRB2~PRB3. In summary, one demodulation reference signal port corresponds to two frequency domain resources (or two frequency domain precoding granularity units). Of course, this embodiment does not exclude that the second precoding granularity unit is the first precoding granularity unit, i.e., one demodulation reference signal port corresponds to the magnitude of one frequency domain bundling.

Figure 7E:
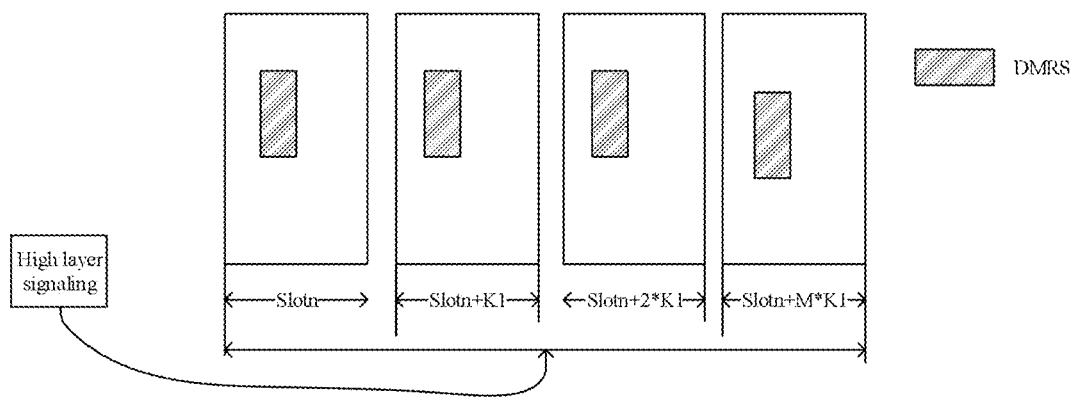
FIG. 7e is another diagram of a time domain area corresponding to higher layer control signaling.

In FIG. 7a, the demodulation reference signal information notified by the higher layer control information is valid in the slotn~slotn+K. Of course, this embodiment does not exclude that the valid time unit of the demodulation reference signal is non-consecutive. As shown in FIG. 7e, the demodulation reference signal is valid every K1 time units. The demodulation reference signal is valid on the time unit, indicating that the terminal may perform the channel estimation based on the demodulation reference signal before the DCI dynamic scheduling information is not obtained in the time unit. When the base station is scheduling, the base station also assumes that the terminal performs the channel estimation based on information notified by the higher layer control information before the DCI dynamic scheduling information is not obtained on these time units, so that reference may be made for the scheduling. For example, in a scheduling scenario that does not influence the MU-MIMO, data is sent preferably to the terminal on the demodulation reference signal port notified by the higher layer control information. The slotn~slotn+K in FIG. 7a or slotn, slotn+K1, . . . , slotn+M*K1 in FIG. 7e constitute a time area (i.e., the above resource area) corresponding to the demodulation reference signal information notified by the higher layer control information. Of course this embodiment does not exclude that the time area corresponding to the demodulation reference signal is other cases.

For the time area corresponding to the demodulation reference signal notified by the higher layer, one mode is to agree a rule with the terminal, and one mode is notified in the higher layer control information described above. On a time unit in addition to the time unit area corresponding to the demodulation reference signal notified by the higher layer, the terminal does not perform channel estimation attempt based on the demodulation reference signal notified by the higher layer control information before the dynamic control information is acquired, thereby reducing the power consumption of the terminal.

In the above implementation mode, the demodulation reference signal information (i.e., the first parameter configuration information or the first transmission parameter set information) is notified in the higher layer control information, and the notified demodulation reference information may be valid in more than one time unit. Of course this embodiment does not exclude that the demodulation reference signal information is notified in the dynamic physical layer control information (i.e., the first parameter configuration information or the first transmission parameter set information is notified in the dynamic physical layer control information), and the notified demodulation reference information is valid in more than one time unit. Or the demodulation reference signal information (i.e., the first parameter configuration information or the first transmission parameter set information is notified in the higher layer control information plus the dynamic physical layer control information) is notified in the higher layer control information and the dynamic physical layer control information, the notified demodulation reference information is valid in more than one time unit.

In an implementation scenario of this embodiment, for the frequency domain resource corresponding to the demodulation reference signal port notified by the higher layer control information and/or the dynamic control information, the terminal assumes that if the base station sends the demodulation reference signal port, the terminal at least sends on the frequency domain resource corresponding to the demodulation reference signal port, even if part of the frequency domain resource does not have the terminal data. For example, as shown in FIG. 7d, the frequency domain resource corresponding to the demodulation reference signal port {1} notified by the higher layer control information and/or the dynamic control information of the terminal are the PRB0~PRB3, and the terminal firstly performs the channel estimation corresponding on the demodulation reference signal port {1} on the PRB0~PRB3 in the slotn. If the dynamic control information knows that the frequency domain resource occupied by the data is PRB0, the terminal assumes that no terminal data is provided in the frequency domain PRB1~PRB3, but the base station at least sends the demodulation reference signal port {1} on the PRB1~PRB3, so that the terminal may at least acquire some large-scale information, or other information of the demodulation reference signal port {1} based on information on the PRB0~PRB3.

In an implementation scenario of this embodiment, the control information is sent to the base station, first information and second information in the control information are jointly encoded.

The first information indicates whether to send the higher layer control information to the terminal (the higher layer control information includes the demodulation reference signal information), and the second information indicates whether a downlink data response and downlink data of the terminal are in a time unit.

Or the second information indicates a time offset value range of the downlink data ACK/NACK response and the downlink data of the terminal. According to whether the time offset value range is less than a predetermined value, whether to send the higher layer control information to the terminal is indicated.

Or whether to send the higher layer control information to the terminal is determined according to a terminal reporting capability level. The capability level of the terminal represents a data processing capability rate level of the terminal.

Similar to the demodulation reference signal information, the transmission parameter, the measurement parameter and the feedback parameter may also be notified in the higher layer control information.

Embodiment Six

In the embodiment, a demodulation reference signal port set of data is configured to a terminal through higher layer control information and dynamic physical layer control information. A demodulation reference signal port set configured by the higher layer control information is called as a first demodulation reference signal port set (i.e., the above first transmission parameter set, or the first parameter configuration), and a demodulation reference signal port set configured to the terminal by the dynamic physical layer control information is a second demodulation reference signal port set (i.e., the above second transmission parameter set, or the second parameter configuration).

A first implementation mode of this embodiment is that the demodulation reference signal port set of the data is a union of the first demodulation reference signal port set and the second demodulation reference signal port set. For example, the demodulation reference signal port set configured to the terminal through the higher layer control information is a port{1}, the port set configured to the terminal through the dynamic physical layer control information is {2, 3}, and then the demodulation reference signal port set of the terminal is a union of {1} and {2, 3}, i.e., a set constituted by demodulation reference signal ports {1, 2, 3}.

Figure 7F:
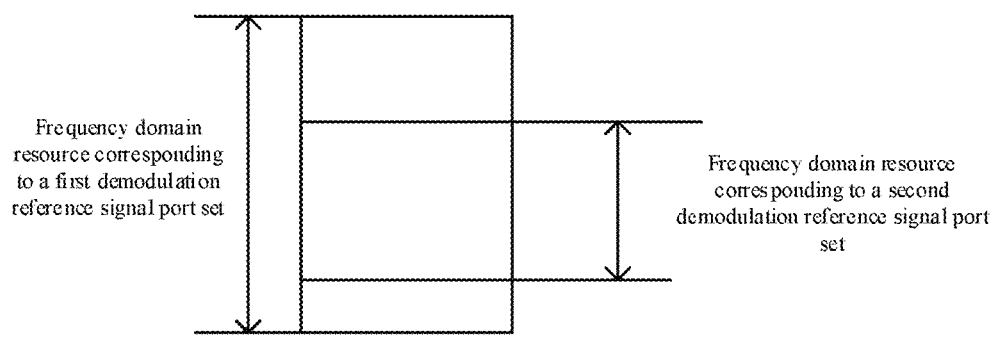
FIG. 7f is a diagram of a frequency domain resource corresponding to a demodulation reference signal port set.

Preferably, the first demodulation reference signal port set {1} corresponds to two frequency domain resources. A first frequency domain resource is a frequency domain that is assumed to be occupied by the demodulation reference signal when the terminal performs the channel estimation based on the port 1 before obtaining DCI. A second frequency domain resource is a frequency domain resource of the demodulation reference signal port set {1} sent to the terminal by the base station after obtaining the DCI. And the second demodulation reference signal port only corresponds to one frequency domain resource, i.e., a frequency domain resource occupied by the data of the terminal. In this case, one mode is to specify that the second frequency domain resource of the first demodulation reference signal port set is a frequency domain resource corresponding to the second reference signal port set. Of course, this embodiment does not exclude that the second frequency domain resource of the first demodulation reference signal port set is different from the frequency domain resource corresponding to the second reference signal port set. That is, in this case, the frequency domain resource corresponding to different demodulation reference signals corresponding to the terminal is allowed to be different. As shown in FIG. 7f, frequency domain resources corresponding to the first demodulation reference signal port set and the second reference signal port set are different, and in particular, the second frequency domain resource of the demodulation reference signal port that does not belong to the second demodulation reference port set and in the first demodulation reference signal port set is different from the frequency domain resource corresponding to the second reference signal port set. For example, the second frequency domain resource of the demodulation reference signal port that does not belong to the second demodulation reference port set and in the first demodulation reference signal port set is agreed to be the first frequency domain resource, and the frequency domain resource corresponding to the second reference signal port set is a frequency domain resource in which data of dynamic control information scheduling is located. For example, the first demodulation reference signal port set is {1, 5}, the second demodulation reference signal port set is {1, 2, 3}, and the demodulation reference signal of the data of the terminal is constituted by ports {1, 2, 3, 5}. In this case, a frequency domain resource corresponding to the port {5} and a frequency domain resource corresponding to the ports {1, 2, 3} may be different. In this case, the number of layers corresponding to the terminal on different frequency domain resources is allowed to be different.

Similarly, the relationship between the time domain resource of the first demodulation reference signal port set and the time domain resource of the second demodulation reference signal may also be determined similarly by using the relationship of the above frequency domain resource, which is not repeated herein.

A second implementation mode of this embodiment is that a priority of the second demodulation reference signal port set is higher than a priority of the first demodulation reference signal port, the demodulation reference signal of data and/or control of the terminal is constituted by the second demodulation reference signal port. For example, the first demodulation reference signal port set is {1} and the second demodulation reference signal port set is {2}, and then the demodulation reference signal of the terminal is constituted by the second demodulation reference signal port set {2}. For another example, the first demodulation reference signal port set is {1, 2}, and the second demodulation reference signal port set is {2}, and then the demodulation reference signal of the terminal is constituted by the second demodulation reference signal port set {2}. For another example, the first demodulation reference signal port set is {1}, and the second demodulation reference signal port set is {1, 2}, and then the demodulation reference signal of the terminal is constituted by the second demodulation reference signal port set {1, 2}.

In an embodiment, a configurable range of configuration information of a second demodulation reference signal is determined according to a configuration of a first demodulation reference signal. Specifically, for example, the configurable range of the configuration information of the second demodulation reference signal is a subset of the configuration of the first demodulation reference signal, or the configurable range of the configuration information of the second demodulation reference signal does not include the configuration of the first demodulation reference signal. Of course, other determination method in which the configurable range of the second demodulation reference signal is determined according to the configuration of the first demodulation reference signal.

Similar to the demodulation reference signal information, the transmission parameter, the measurement parameter and the feedback parameter may also be notified in the higher layer control information and the dynamic physical layer control information.

Embodiment Seven

In this embodiment, higher layer configuration information configures demodulation reference information of a control channel (i.e., the above first transmission parameter set, or the first parameter). Information of the above demodulation reference signal includes at least one of: demodulation reference. signal port set information, pattern selection information corresponding to a demodulation reference signal port, number information of the demodulation reference signal port, a frequency domain resource corresponding to the demodulation reference signal port set, a time domain precoding granularity unit of the demodulation reference signal, time domain symbol index information occupied by the demodulation reference signal, a frequency domain first precoding granularity unit corresponding to the demodulation reference signal, a third reference signal port set corresponding to the demodulation reference signal of a control channel, a time domain area division situation corresponding to the demodulation reference signal port set.

To support an MU-MIMO transmission by the time domain area and/or frequency domain area detected by an MU interference corresponding to the demodulation reference signal port set, and since the MU-MIMO transmission needs to be supported, control channel demodulation reference signal port information allocated to different terminals on the same time-frequency resource may be different. The terminal needs to perform the MU interference cancellation, and the complexity of the terminal is relatively high, so that the time domain and/or frequency domain limitation may be performed on the demodulation reference signal area. That is, the terminal does the control channel MU interference cancellation on the notified frequency domain area and/or the time domain area. The third reference signal port set is used for assisting the terminal in performing the MU interference cancellation. For example, if the terminal is unable to assume that a port in the third reference signal port set is not occupied by other communication nodes, the terminal needs to perform interference estimation on the port in the third reference signal port set. Of course, the terminal may also perform the MU interference cancellation on a set constituted by a difference set of the third reference signal port set and the demodulation reference signal of the control channel.

For a time domain resource division area corresponding to a control channel demodulation reference signal port, a sending beam corresponding to different areas is different, and/or a receiving beam corresponding to different areas is different. For example, a time domain area corresponding to a control channel demodulation reference signal port is the slotn~slotn+5, the time domain area is divided into an area 1 including the slotn~slotn+4 and an area 2 including the slot5. In this case, one area may also be called as a related area.

The demodulation reference signal information notified by the higher layer control information may also be sent by more than one piece of control information. The control information the following information types: RRC control information, MAC-CE control information and physical layer dynamic control information.

Similar to the demodulation reference signal information, the transmission parameter, the measurement parameter and the feedback parameter may also be notified in the higher layer control information.

Embodiment Eight

In this embodiment, the above transmission parameter includes at least one or more of: a precoding bundling parameter, a Quasi-Co-Location (QCL) relation indication parameter, a resource configuration parameter, a rate matching parameter, a reference signal configuration related parameter, a receiving mode configuration parameter, a transmission technology/mode, a transmission mode, a mapping/interleaving parameter, a sending beam configuration parameter, a modulation order configuration parameter, an encoding rate configuration parameter, a modulation code scheme (MCS) configuration parameter, a number of codewords, a number of transmission layers, a multiple access manner, a resource multiplexing manner, a waveform configuration parameter, a sending power configuration parameter, a numerology parameter, a hybrid automatic repeat request (HARQ) related parameter, a measurement parameter and a feedback parameter.

The precoding bundling parameter includes at least one of: a precoding time domain granularity parameter (i.e., a time domain Bundling granularity), a precoding frequency domain granularity parameter (such as a frequency domain Bundling magnitude), and a precoding area division method (for example, the precoding area division is based on a system bandwidth, a time unit, a time domain resource or a frequency domain resource allocated to a terminal, which specifically refers to the embodiment 13, where a sending beam is the same and/or a receiving beam is the same in a precoding area, or the precoding area is called as a related area), and whether to support a time domain Bundling parameter.

The QCL relation indication parameter includes at least one of: reference signal information associated with the QCL, group information related to the QCL relationship, a QCL relationship type, and a channel characteristic parameter corresponding to the QCL relationship.

The resource configuration parameter includes at least one of: a definition of a resource granularity, a magnitude of an allocation resource, a type of a resource, a time domain resource configuration parameter, and a frequency domain resource configuration parameter; such as a time domain/frequency domain resource occupied by data allocated to the terminal, or a time domain/frequency domain resource corresponding to a reference signal allocated to the terminal.

The rate matching parameter includes at least one of: a time domain resource occupied by the reference signal, a frequency domain resource occupied by the reference signal, a start position of a data channel, an end position of the data channel, an area occupied by an uplink control channel, an area occupied by a downlink control channel, a time domain position needed to be punched of the data channel, or a frequency domain position needed to be punched of the data channel.

The reference signal configuration related parameter includes at least one of: density information, sequence information, port number information, reference signal pattern information, a time domain resource corresponding to the reference signal, a frequency domain resource corresponding to the reference signal, power information, a multiplexing mode, an OCC length, an enabling parameter, precoding information, a port numbering rule or a reference signal type.

Specifically, if the reference signal is a demodulation reference signal (DMRS), configuration information of the DMRS includes: a density, a sequence, the number of ports, a pattern, power, a multiplexing mode, an OCC length, and a time domain symbol in which the DMRS is located and a Bundling area of the DMRS.

When the reference signal is a phase compensation reference signal (PTRS), the following information may be notified: the number of ports, a sequence, a time domain density, an enabling parameter, a position, a power, and precoding.

When the reference signal is a measurement reference signal (a CSI-RS or an SRS), at least one of the following information may be notified: a pattern, a density, an OCC, a sequence, power, a multiplexing mode, a numbering rule, a type (the CSI-RS type may be distinguished by at least one of the following characteristics: full bandwidth transmission or partial bandwidth transmission; whether the measurement reference signal is used for beam management or is acquired for channel quality; whether a number of time domain transmission repetitions of the measurement reference signal in a period is greater than a predetermined threshold value or the number of time domain transmission repetitions of the measurement reference signal in a period is equal to or less than the predetermined threshold value; whether a time domain symbol in which the measurement reference signal is located only has the measurement reference signal or the time domain symbol in which the measurement reference signal is locate has symbols in addition to the measurement reference signal; whether the measurement reference signal has a repetition pattern in a time domain or the measurement reference signal does not have the repetition pattern in the time domain; whether the measurement reference signal is sent in an IFDMA manner or the measurement reference signal is sent in a manner of increasing a subcarrier spacing; whether the measurement reference signal has a corresponding QCL reference signal or the measurement reference signal does not have the corresponding QCL reference signal.

The receiving mode configuration parameter includes at least one of: a receiving beam, a receiving precoding weight value, a receiving antenna, QCL reference signal information corresponding to the receiving mode.

The sending mode configuration parameter includes at least one of: a sending beam, a sending precoding weight value, a sending antenna, QCL reference signal information corresponding to the sending mode.

The transmission technology parameter includes at least one of: diversity, an open loop, a semi-open loop, a closed loop, and a precoding polling.

The transmission technology parameter includes at least one of: a single-beam transmission, a multi-beam transmission, a single TP/Cell, a multi-TP/Cell, an SU/MU; a single layer/a multilayer or other transmission technologies.

The sending power configuration parameter includes at least one of: absolute power, a relative power offset, and a relative power reference object.

The numerology parameter includes at least one of: a subcarrier spacing, a time domain symbol length, and a CP length.

The HARQ related parameter includes at least one of: a process number, a new data indication (NDI), a redundancy version (RV) and a number of processes.

The measurement parameter includes a measurement period, a measurement limitation condition, an interference measurement reference signal, a time domain resource in which the measurement reference signal is located, a frequency domain resource in which the measurement reference signal is located, and a measurement reference signal type.

A reporting parameter includes: a reporting type, a time domain resource occupied by reporting information, a frequency domain resource in which the reporting information is located, and the reporting information is the used sending beam, and receiving beam information corresponding to a reporting resource.

For a configuration method for the transmission parameter type, the first mode of the configuration method is that the transmission parameter type information is included in M transmission parameter sets. A configuration of the transmission parameter type is included in each transmission parameter set, each transmission parameter set corresponds to one resource area (such as a time area), and M is a natural number greater than 1. At the interacted section of M resource areas, multiple transmission parameter sets of the M transmission parameter sets jointly determine a configuration value of the transmission parameter type (for example, the configuration value of the transmission parameter type is determined through a union of the multiple transmission parameter sets), or the configuration value of the transmission parameter is determined by one of the M transmission parameter sets (for example, the configuration value of the transmission parameter is determined by a transmission parameter set with a high priority). At a section on which the resource area independently acts (the independent section of a resource area is a section in the resource area that does not intersect with any one resource area of the M resource areas), and the configuration value of the transmission parameter is determined by the transmission parameter set corresponding to the resource area. For example, M=2, a first transmission parameter set is notified by higher layer control information, and a second transmission parameter set is notified by physical layer dynamic control information. The first transmission parameter set may also be notified or agreed by one of: notified by a system message, notified by previous physical layer dynamic control information, or predetermined by a base station and a sending end.

In an embodiment, on a resource area before the second transmission parameter set is correspondingly obtained in the interacted section of a second resource area and a first resource area, the signal is sent or received by the first transmission parameter, after the second transmission parameter set is obtained, the processing method of the above interacted section is adopted. The configuration value of the transmission parameter is determined by a union of the M transmission parameter sets, or the configuration value of the transmission parameter is determined by one of the M transmission parameter sets and signal sending and receiving is performed according to configuration value of the transmission parameter. As shown in FIG. 7b, the first transmission parameter set is notified by the higher layer control information, and the corresponding resource area includes a slotn. The second transmission parameter set is notified by the dynamic physical layer control information, and an area it acts also includes the slotn. But on a time domain symbol before the dynamic physical layer control information is demodulated (which corresponds to a time domain symbol before a time domain symbol 4 in the slotn, or a time domain symbol section in addition to a downlink control area before the time domain symbol in the slotn), the dynamic physical layer control information is not acquired yet. In this case, signal reception, and/or channel estimation, and/or data demodulation are performed by transmission parameter information notified by the higher layer control information. After the dynamic physical layer control information is acquired, the configuration value of the transmission parameter in the area before the time domain symbol 4 is determined according to the configuration value of the transmission parameter notified in the dynamic physical layer control information, or according to the configuration value of the transmission parameter notified in the dynamic physical layer control information and the configuration value of the transmission parameter of the higher layer control information.

In an embodiment of this embodiment, M=3, the first transmission parameter set is notified by RRC control information, the second transmission parameter set is notified by MAC-CE control information, and a third transmission parameter set is notified by the physical layer dynamic control information.

A second mode of the configuration method for the transmission parameter is to determine the number of parameter configurations corresponding to the parameter type according to the parameter type or the indication information. For example, when the number of parameter configuration is determined to be one, the configuration value of the parameter is determined according to a first parameter configuration, in this case, the first parameter configuration is notified in one piece of the control information. When the number of parameter configuration is determined to be greater than 1, the parameter type has X parameter configurations, where each parameter configuration has a configuration value of the parameter type, and each parameter configuration corresponds to a time area. Similar to the parameter configuration determination method according to the M transmission parameter sets, at the interacted section of the multiple time areas, the configuration value of the parameter type is jointly determined according to multiple parameter configurations of the X parameter configurations, or the configuration value of the parameter type is determined according to one of the X parameter configurations (for example, the configuration value of the parameter is determined according to a parameter configuration having a higher priority in the parameter configurations). At an independent acting section of one resource area (the independent acting represents that the time area is not interacted with any one time area of the X time areas), and the configuration value of the transmission parameter is determined according to the parameter configuration corresponding to the time area. For example, the X parameter configurations are respectively notified by the RRC control information, the dynamic physical layer control information, or the X parameter configurations are respectively notified by first RRC control information and second control information.

The priority of the transmission parameter sets (or the parameter configurations) may be determined by the modes described below.

the later the control information time notifying the transmission parameter set is, the higher the priority of the transmission parameter set is.

The priority of the transmission parameter set is determined according to the indication information, where the indication information includes priority information of the transmission parameter set.

Embodiment Nine

In this embodiment, control channel demodulation reference information (i.e., the above transmission parameter set or the parameter configuration information) is configured through multi-level control information. A control channel demodulation reference port set notified by low-level control information is a subset of a control information port set notified by high-level control information.

In this embodiment, levels of RRC control information, MAC CE control information, and physical layer dynamic control information are sequentially decreased.

Figure 8:
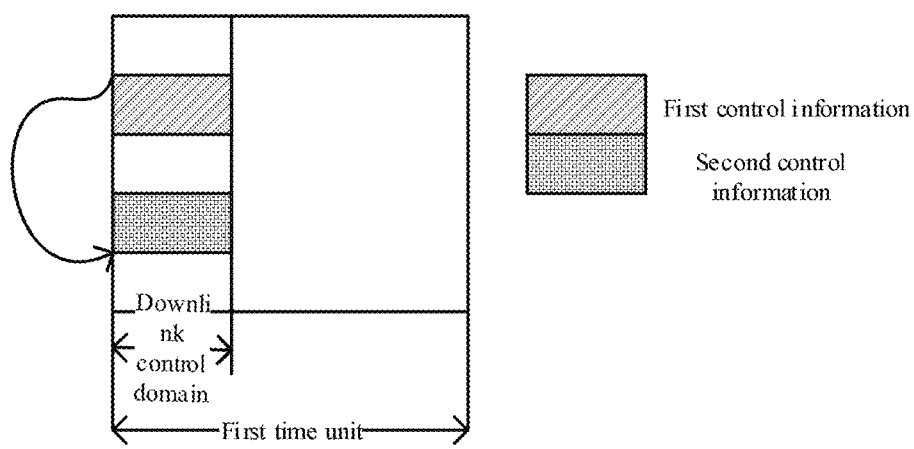
FIG. 8 is a diagram of relevant information of first control information indicating second control information.

For example, a first demodulation reference signal port set is configured for a control channel demodulation reference signal of a terminal through the RRC control information, and a second port set is configured for the control channel demodulation reference signal of the terminal through the MAC CE control information. The second port set is a subset of the first port set, or is a selection for the first port set in the MAC CE control information. Of course, this embodiment does not exclude that the physical layer dynamic control information selects in the demodulation reference signal port set configured by the MAC CE control information, and the selected demodulation reference signal port is used as the subsequent control channel demodulation reference signal port of the terminal, or as the demodulation reference signal port of second control information in this time unit. As shown in FIG. 8, in a time unit, first control information indicates demodulation reference signal port information of the second control information. In FIG. 8, the first control information and the second control information are frequency-divided, and of course this embodiment does not exclude that the first control information and the second control information are time-divided, and/or frequency-divided.

Similarly, the transmission parameter may also be configured through multi-level control information.

Embodiment Ten

In this embodiment, higher layer control information configures transmission parameter information (the above first parameter configuration), which corresponds to a time transmission area, such as corresponding to a first time window in FIGS. 5*a* to 5*e*.

A terminal performs the information processing of the steps 1 and 2 described below.

In step 1: the terminal performs signal reception, and/or channel estimation, and/or data equalization, and/or channel decoding on each time unit included in the first time window by using a transmission parameter notified by the higher layer control information. Meanwhile dynamic physical layer control information is also detected.

In step 2

If the dynamic physical layer control information (or not detected dynamic physical layer control information of a channel or a signal, where the transmission parameter is a transmission parameter related to the channel or the signal) is not detected on the time unit, the higher layer control information is taken as a configuration value of the transmission parameter to perform the information processing.

If the dynamic physical layer control information is detected after a nth time domain symbol (n is an integer and the time domain symbol of the time unit is numbered from 0) on the time unit, the dynamic control information further includes a configuration value of the transmission parameter having the same type notified in the higher layer control information, and then the value of the transmission parameter is determined according to the dynamic control information, or the configuration value of the transmission parameter is jointly determined according to the dynamic control information and the higher layer control information, and the information processing is performed according to the determined configuration value.

Or in the step 2:

if the dynamic physical layer control information is not detected on the time unit, an information processing result that has been obtained is discarded to wait for a nest time unit.

If the dynamic physical layer control information is detected after the nth time domain symbol (n is an integer and the time domain symbol of the time unit is numbered from 0) on the time unit, the dynamic control information further includes the configuration value of the transmission parameter notified in the higher layer control information, and then the value of the transmission parameter is determined according to the dynamic control information, or the configuration value of the transmission parameter is jointly determined according to the dynamic control information and the higher layer control information.

Or in the step 2:

if the dynamic physical layer control information is not detected on the time unit, a data processing result that has been obtained is discarded.

If the dynamic physical layer control information is detected after the nth time domain symbol (n is an integer and the time domain symbol of the time unit is numbered from 0) on the time unit, the dynamic control information indicates whether a signal/a channel of the terminal is provided (such as whether scheduling data of the terminal is provided or whether a measurement reference signal of the terminal is provided). If the scheduling data of the terminal is provided, the subsequent processing of the information is continued according to the information processing result obtained in the step 1. If no scheduling signal/channel of the terminal is provided, the information processing result obtained in the step 1 is discarded.

The above information processing includes processing for a data channel processing, a measurement reference signal or an uplink control channel.

Embodiment Eleven

In this embodiment, a terminal corresponds to multiple demodulation reference signal port sets (the above reference signal resource area), and a frequency domain Bundling (the above transmission parameter) corresponding to each demodulation reference signal port set is different.

Figure 9:
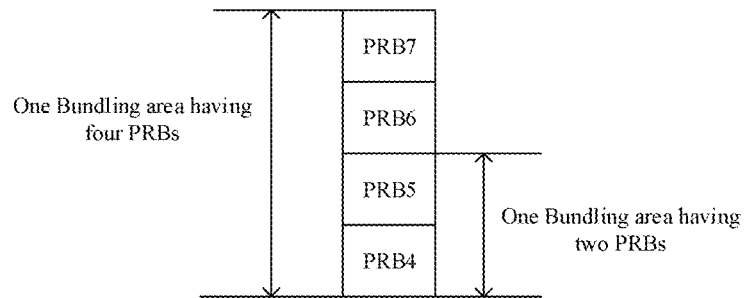
FIG. 9 is a diagram of Bundlings with different sizes.

A first implementation mode in which the frequency domain Bundling is different is that the frequency domain Bundling magnitude is different. For example, the frequency domain Bundling magnitude of a first demodulation reference signal port set is two PRBs, and the frequency domain Bundling magnitude of a second demodulation reference signal port set is four PRBs. Preferably, the small frequency domain Bundling area falls in the large frequency domain Bundling area, as shown in FIG. 9.

Figure 10:
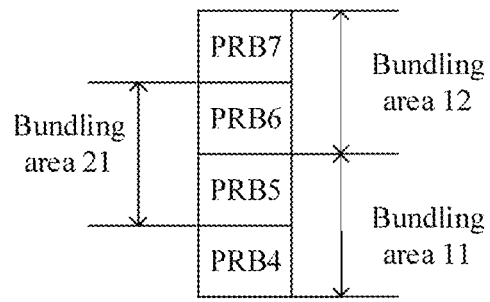
FIG. 10 is a diagram of Bundlings with a same size but different Budling area divisions.

A second implementation mode in which the frequency domain Bundling is different is that the frequency domain Bundling magnitude is the same while the division of the frequency domain Bundling area is different, as shown in FIG. 10.

A base station notifies the terminal of frequency domain Bundling information corresponding to each demodulation reference signal port set Or the base station notifies the terminal of frequency domain Bundling information corresponding to part of the demodulation reference signal port sets, and frequency domain Bundling information corresponding to the other demodulation reference signal port sets is obtained according to an agreed rule.

The demodulation reference signal of data and/or control of the terminal is constituted by a union of the first transmission parameter set and the second transmission parameter set. Or different demodulation reference signal port sets corresponding to the terminal have priorities.

In one frequency domain Bundling area, a sending beam of the signal is unchanged, and/or a receiving beam of the signal is unchanged.

Similarly, the terminal corresponds to multiple demodulation reference signal port sets, and a time domain Bundling corresponding to each demodulation reference signal port set is different. A base station notifies the terminal of time domain Bundling information corresponding to each demodulation reference signal port set, which is not repeated herein.

Embodiment Twelve

In this embodiment, a terminal corresponds to multiple demodulation reference signal port sets (the above resource area), and a frequency domain resource (the above transmission parameter) corresponding to each demodulation reference signal port set is different.

Figure 11:
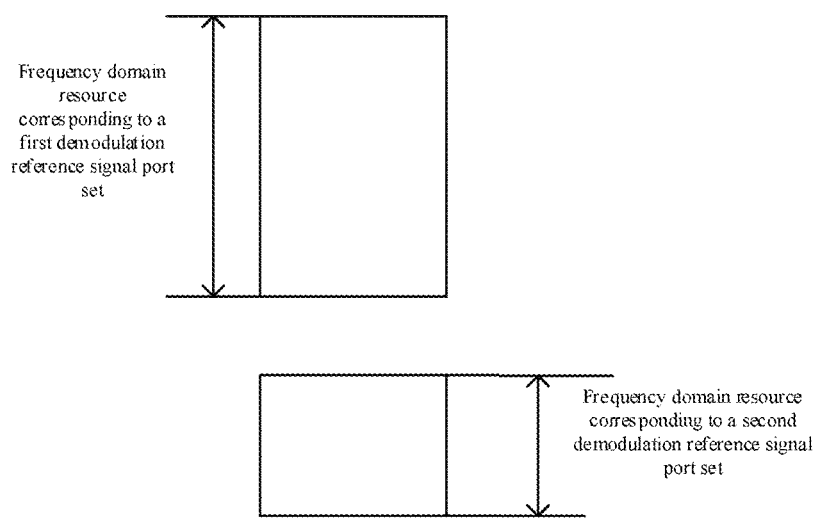
FIG. 11 is a diagram of a frequency domain resource corresponding to another demodulation reference signal port set.

The frequency domain resource corresponding to the demodulation reference signal is different. A first implementation mode represents that the frequency domain resource occupied by data corresponding to different demodulation reference signals is different. The frequency domain resource occupied by a demodulation reference signal port is the frequency domain resource occupied by the data corresponding to the demodulation reference signal port. For example, the frequency domain of a demodulation reference signal port 1 corresponds to PRB0~PRB3, and then the frequency domain resource occupied by the data corresponding to the demodulation reference signal port 1 is also PRB0~PRB3, as shown in FIG. 11.

The frequency domain resource corresponding to the demodulation reference signal is different. A second implementation mode represents that the first frequency domain resource corresponding to different demodulation reference signals is different. A first frequency domain resource corresponding to a demodulation reference signal is different from the frequency domain resource occupied by the data of the demodulation reference signal. For example, a demodulation reference signal corresponds to the first frequency domain resource configured by the higher layer, and the frequency domain resource occupied by the data corresponding to the demodulation reference signal is a subset of the first frequency domain resource, and/or the first frequency domain resource may be a minimum frequency domain unit sent by the demodulation reference signal, or the first frequency domain resource is a maximum frequency domain resource sent by the demodulation reference signal.

Embodiment Thirteen

The division of a frequency domain Bundling area in the LTE is determined according to a system bandwidth, and is basically Cell-Specific. For example, the frequency domain Bundling is 2 PRBs, and the system available PRB includes 50 PRBs, and then starting from a lowest frequency domain PRB0, each 2 PRBs form a PRB Bundling area.

In the NR, since a system bandwidth seen on a base station side and a system bandwidth seen by a terminal may be different, i.e., in this case, the system bandwidth may be UE—Specifically allocated, and the division of the PRB Bundling area needs to be further considered.

Figure 12:
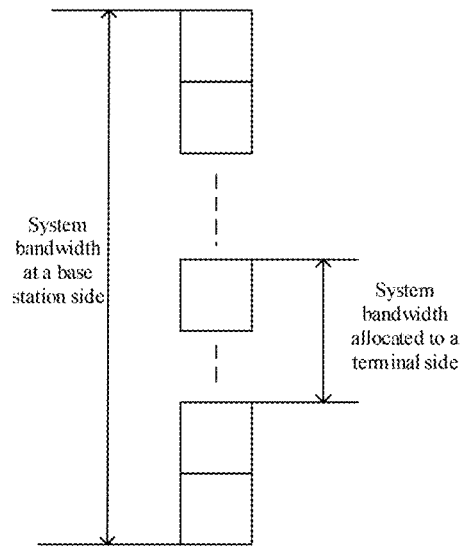
FIG. 12 is a diagram of considering a system bandwidth on a base station side and a system bandwidth allocating to a terminal when a Bundling area is divided.
Figure 13:
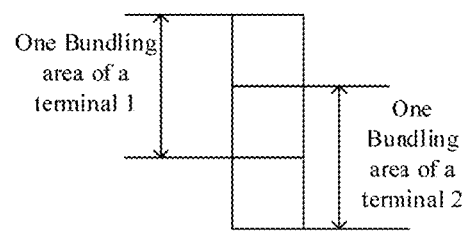
FIG. 13 is a diagram of Bundlings with a same size but different Budling area divisions.

The first manner of this embodiment is to divide the PRB Bundling area from the lowest frequency domain of the system bandwidth seen by the terminal instead of dividing the PRB Bundling area from the system bandwidth on the base station side. As shown in FIG. 12, the system bandwidth on the base station side is different from the system bandwidth on the terminal side. Preferably, when the system bandwidth is allocated to the terminal, the boundary of the system bandwidth is consistent with the boundary of dividing the PRB Bundling area obtained based on the base station side, so that the boundaries of the PRB Bundling area obtained based on the system bandwidth on the base station side and the PRB Bundling area obtained based on the system bandwidth on the terminal side are consistent. And a case as shown in FIG. 13 of different area division when different terminals have the same Bundling magnitude cannot occur.

Figure 14:
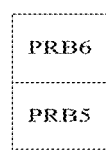
FIG. 14 is a diagram of performing Budling area division according to a frequency domain resource set allocating to a terminal.
Figure 14:
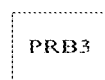
Figure 14:
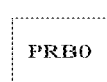

A second manner of the embodiment is to divide the PRB Bundling area based on resources allocated to the terminal in the current time unit. As shown in FIG. 14, the resources allocated to the terminal in the current time unit are {PRB0, PRB3, PRB5, PRB6}, when the PRB Bundling includes two PRBs, {PRB0, PRB3} constitute a PRB Bundling area, and {PRB5, PRB6} constitute another PRB Bundling area. Of course, performing the division of the PRB Bundling area based on the resource allocated to the terminal in the current time unit may be further limited. For example, when the spacing between two allocated resources is greater than the PRB Bundling magnitude, the two allocated resources are not divided into a PRB Bundling area. As shown in FIG. 14, in this case, three PRB Bundling areas of {PRB0}, {PRB3}, {PRB5~6} are constituted.

Embodiment Fourteen

A frequency domain unit of the signal is determined according to the number of time domain symbols occupied by the signal. The frequency domain unit of the signal includes at least one of the following units: a frequency domain scheduling unit corresponding to the signal; a precoding frequency domain unit corresponding to the signal.

The length of the time domain symbols satisfies at least one of the following characteristics: the number of time domain symbols is the number of first reference time domain symbols corresponding to the signal; the number of time domain symbols is the number of time domain symbols corresponding to the signals; the number of time domain symbols is the number of first time units corresponding to the signal. For example, if a subcarrier spacing corresponding to the demodulation reference signal is 60 kHz, the number of time domain symbols occupied by the signal is the number of time domain symbols with the subcarrier spacing of 60 kHz, and the number of first reference time domain symbols is the number of time domain symbols not with the subcarrier spacing of 60 kHz. For example, the number of first reference time domain symbols is the number of time domain symbols with a subcarrier spacing of 15 kHz. In this case, a time domain symbol of 15 kHz corresponds to the number of the time domain symbols of one piece of 60 kHz, and a time domain symbol of 15 kHz corresponds to the number of the time domain symbols of 4 pieces of 60 kHz.

The less the time domain symbols occupied by the signal is, the larger the frequency domain unit is. For example, the relationship established between the number of frequency domain units and the number of time domain symbols is as shown in table 1.

TABLE ONE

| Frequency domain unit (unit: PRB) | The number of time domain symbols (unit: a length of the time domain symbol with the subcarrier spacing of 15 kHz, including CP) |
|---|---|
| 8 | 1~2 |
| 6 | 3~4 |
| 4 | 5~7 |
| 2 | 7~14 |

The frequency domain unit may be further determined in combination with at least one of: a magnitude of the frequency domain resource occupied by data of the current terminal, a data transmission block magnitude of the terminal, and a carrier frequency position in which communications are located.

Of course, the embodiment also does not exclude other correspondence between the number of time domain symbols and the frequency domain unit. For example, the less the number of time domain symbols is, the less the frequency domain unit is. Or the number of time domain symbols and the frequency domain unit has a relationship, but the relationship is not a monotonous relationship. The monotonous relationship may be an area monotonous relationship shown in table 1, for example, the number of time domain symbols is 3~4, and the corresponding frequency domain unit is 4, such case does not satisfy the monotonous relationship (the number of time domain symbols does not determine the magnitude of frequency domain unit). But the number of time domain symbols which is 3~4 and the number of time domain symbols which is 5~7 have the monotonous relationship, i.e., the larger the number of time domain symbols is, the less the corresponding frequency domain unit is.

The method of the embodiment may be similarly used in a case where a time domain unit of the signal is determined according to the magnitude of the frequency domain unit occupied by the signal. The time domain unit of the signal includes at least one of the following units: a time domain scheduling unit corresponding to the signal; a precoding time domain unit corresponding to the signal, which is not repeated herein.

Embodiment Fifteen

In this embodiment, a base station performs a joint encoding notification on frequency domain resource information and time domain resource information of the above signal in a control information notification domain.

Through the joint encoding, control information overhead may be saved. For example, if 3 bits are required for separately notifying the frequency domain resource, 2 bits are required for separately notifying the time domain resource, such as a start symbol position and/or an end symbol position of the time domain resource. And if the joint encoding may remove some unnecessary notification situations, only 4 bits may notify the above information. Of course, this embodiment does not exclude a case where the notification bit number of the joint encoding is the same with a sum of the number of bits for separately notification, but a case where the notification bit number of the joint encoding is less than a sum of the number of bits for separately notification, thus in general, the control information overhead may be saved.

Embodiment Sixteen

In the embodiment, the notification bit number of the frequency domain resource is determined according to the number of time domain symbols corresponding to the above signal, or is determined according to the time domain symbols occupied by a transmission domain having a same transmission direction with the above signal in one time unit.

For example, the number of time domain symbols occupied by a symbol notifying a terminal in first control information, the bit number of a frequency domain resource domain of a signal notifying the terminal in second control information is determined according to the number of time domain symbols occupied by the above symbol. Preferably, the first control information is high layer control information, and the second control information is physical layer dynamic control information, and of course, it is not excluded that the first control information and the second control information both are the physical layer dynamic control information.

Or the number of time domain symbols occupied by the transmission domain having the same transmission direction of the terminal in the current time unit is notified in the first control information, such as the number of time domain symbols occupied by a downlink transmission domain in the current time unit, and/or the time domain symbol position occupied by the signal of the downlink transmission domain, the number of bits notifying the frequency domain resource domain occupied by terminal downlink data in the second control information is determined by the number of time domain symbols occupied by the downlink transmission domain. Preferably, the first control information is public control information and the second control information is dedicated control information. At this case, one type of the number of time domain symbols in the downlink transmission domain includes the downlink control domain, and one type does not include the downlink control domain.

The method in this embodiment may be similarly used a case where the notification bit number of the time domain resource is determined according to a frequency domain resource magnitude corresponding to the signal, or determined according to a magnitude of a frequency domain bandwidth allocated to the terminal, which is not repeated herein.

Embodiment Seventeen

In the embodiment, a transmission parameter of a measurement reference signal transmitted periodically or a measurement reference signal transmitted semi-periodically (such as an SRS and a CSI-RS) is in higher layer control information (first parameter configuration information).

Parameters having the same type are further notified in physical layer dynamic control information, so as to adopt the dynamic resource scheduling.

In a time unit without the dynamic control information, a value of the parameter type is determined only according to the higher layer control information. When the time unit has the dynamic control information, the value of the parameter type is determined according to the dynamic physical layer control information. For example, the transmission parameters include time domain resources occupied by the parameter signal and frequency domain resources occupied by the reference signals. When the time domain resource and/or the frequency domain resource (the time domain resource or the frequency domain resource configured by the first parameter) occupied by the measurement reference signal in a time unit cannot be used for the measurement reference signal, dynamic signaling is required for informing the terminal of the information.

For example, the time domain/frequency domain occupied by the measurement reference signal on a slotn notified by the higher layer is occupied by other signals or channels, and the base station notifies the terminal of the information in the dynamic control information on the slotn. When the measurement reference signal is the SRS, the terminal is unable to send the SRS on the slot, or send part of SRS (which is a part not occupied by other signals or channels), or the control information notifies the slotn of a new time domain/frequency domain position of the measurement reference signal (i.e., the second parameter configuration), and sends the SRS on the new time domain/frequency domain position. According to the acquired new time domain/frequency domain position, on a next period, one manner follows the first parameter configuration, one manner follows a second parameter, i.e., after the slotn, the first parameter configuration is updated to the second parameter configuration.

When the measurement reference signal is the SRS, the base station may send the control information on the slotn, or send the control information after the slotn, so that the terminal knows that the measurement reference signal on the slotn changes the time domain/frequency domain resource, or no measurement reference signal is sent on the slotn, or only part of the measurement reference signal is sent on the slotn, or no measurement reference signal is sent on the slotn, and the measurement reference signal is sent on a slotn+k.

Furthermore, the control information may indicate or agree that whether the terminal need to detect the dynamic control information to determine the time domain and/or frequency domain position in which the measurement reference signal is located, i.e., the terminal needs to determine whether the parameter type of the time domain and/or frequency domain position in which the measurement reference signal is located has one parameter configuration or two parameter configurations.

Embodiment Eighteen

In this embodiment, parameters having the same type are not only configured in higher layer control information, but also are configured in physical layer dynamic control information. Or the parameters having the same type are configured in RRC control information and also configured in MAC-CE control information. Or the parameters having the same type are configured in RRC control information and also configured in MAC-CE control information.

Embodiment Nineteen

In this embodiment, parameters having the same type are not only configured in higher layer control information, but also are configured in MAC-CE control information and also configured in physical layer dynamic control information.

Embodiment Twenty

In this embodiment, for parameters having the same type, a transmission parameter set corresponds to multiple subsets, and each transmission parameter subset corresponds to a configuration value of the parameters having the above-mentioned type.

Specifically, for example, each subset corresponds to a configuration value of the transmission parameter corresponding to a virtual transmission cell.

For example, 3 pieces of frequency domain resources are allocated to a terminal in one time unit (each corresponds to a virtual cell), the transmission parameter corresponding to each piece of the frequency domain resource has related information such as the independent configuration (such as an MCS and a DMRS), and of course part of the transmission parameters on the three frequency domain resources may be the same (such as a NDI and a RV).

Or the multiple subsets included in a transmission parameter set are different configurations of one transmission parameter set. For example, the higher layer configures a first transmission parameter set, the parameter type included in the first transmission parameter set are two type of information {frequency domain resource, MCS, DMRS}, the first transmission parameter set include three subsets such as {{frequency domain resource 1, MCS1, DMRS1}, {frequency domain resource 1, MCS2, DMRS2}, {frequency domain resource 3, MCS3, DMRS3}}. MCS1 to MCS3 denote three MCS configuration values, similarly, DMRS1 to DMRS3 denote three DMRS configuration values, and frequency domain resource 1 to frequency domain resource 3 denote three frequency domain resource allocation values. A second transmission parameter set is notified in physical layer dynamic control information, and the second transmission parameter set includes three sets, which are respectively {{frequency domain resources d1, MCSd1, DMRSd1}, {frequency domain resources d1, MCSd2, DMRS d2}, {frequency domain resources d3, MCSd3, DMRS d3}}. MCSd1 to MCSd3 denote the three MCS configuration values, similarly, DMRS d1 to DMRS d3 denote three DMRS configuration values, and frequency domain resources d1 to d3 correspond to three frequency domain resource allocation values.

In the above embodiment, the numbers of the subsets included in the first transmission parameter set and the second transmission parameter set are the same, and this embodiment does not exclude the case that the numbers of the subsets included in the two sets are different.

Embodiment Twenty-One

In the embodiment, a transmission parameter having the same type corresponds to multiple parameter configurations, different parameter configurations correspond to different frequency domain resources.

For example, OCC length information of the transmission parameter being a demodulation reference signal is different in different frequency domain resources, so that the number of MU users or the number of layers corresponding to different frequency domain resources in the same time unit is allowed to be different.

For example, a demodulation reference signal port set corresponding to MU interference cancellation performed by the transmission parameter being a demodulation reference signal is different, so that the number of MU users or the number of layers corresponding to different frequency domain resources in the same time unit is allowed to be different.

For example, the transmission parameter is RI information, the number of layers corresponding to different frequency domain resources is allowed to be different.

For example, the transmission parameter is MCS information, MCS corresponding to different frequency domain resources is allowed to be different.

The transmission parameter may be one or more of the above transmission parameters in the embodiment eight.

Embodiment Twenty-Two

In the embodiment, a first resource area is changed according to a second resource area, for example, a first transmission parameter set (or a first parameter configuration) is configured for the higher layer. A first time area corresponding to a first transmission parameter is one of first time windows in FIG. 5a or FIG. 5b. A second transmission parameter is notified in physical layer dynamic control. A second time area corresponding to the second transmission parameter is one of second time windows in FIG. 5a or FIG. 5b, i.e., before a slotn1, the first time window is {slotn1, slotn2, slotn3, slotn4}, the first time window in a slotn2 is {slotn1, slotn3, slotn4}. For example, the transmission parameter is a measurement reference signal parameter, and the first time window has time units in addition to the time units in the second time window.

Embodiment Twenty-Three

In the embodiment, a first transmission parameter is notified in higher layer control information. The first transmission parameter is notified in dynamic control information (which corresponds to FIG. 5a or FIG. 5b). The dynamic control information further indicates whether the dynamic control information has information updating for a parameter having the same type.

The transmission parameter is a time domain start position allocated to a data channel of a terminal. Higher layer control information indicates to start from a second time domain, and the dynamic control information indicates whether to maintain an original state. When maintaining the original state is indicated, data of the terminal starts from a second symbol notified by the higher layer. When changing a new state is indicated, the dynamic control information further indicates a start position of the data starting, or an offset value of the start position of the data with respect to a start position of the higher layer.

For example, the transmission parameter is a frequency domain resource occupied by a data channel allocated to the terminal. The first dynamic control information indicates whether the frequency domain resource is changed. If the frequency domain resource is not changed, the frequency domain resource of the terminal in the current time domain is indicated by the higher layer control information. If the frequency domain resource is changed, a new frequency resource is further indicated in second dynamic control information.

Or the number of bits needed by physical layer dynamic information is determined according to whether the transmission parameter is changed.

Embodiment Twenty Four

In this embodiment, multiple transmission parameter sets are notified in high layer control information, and physical layer dynamic control information selects one set from the multiple transmission parameter sets.

The transmission parameter may be an arbitrary one in the embodiment 8.

The transmission parameter set includes one or more transmission parameter types, each transmission parameter combines a set such as a higher layer configured demodulation reference signal port set {1, 2, 3}, {2, 3, 4}, {5, 6}; a demodulation reference signal set corresponding to the current data channel in physical layer dynamic control information;

or the higher layer configured demodulation reference signal port set is a demodulation reference signal port set performing MU interference cancellation for a terminal. For example, the terminal is unable to assume that a port in the reference signal port set is not occupied by other users. It is unable to assume that port of the demodulation reference signal corresponding to a data channel in the reference signal port set in addition to the terminal is not occupied by other users.

Embodiment Twenty-Five

In this embodiment, the higher layer configures first transmission parameter set information. The transmission parameter set includes the following eleven parameter types:

carrier frequency indication information, time-frequency resource allocation indication information of a downlink data channel, uplink power configuration parameter, time domain/frequency domain related indication information of an uplink control channel, HARQ process number, antenna port/sequence scrambling information/layer number joint indication information, uplink measurement reference signal request information, MCS, NDI, RV indication information, PQI indication information (PDSCH RE Mapping and Quasi-Co-Location Indicator).

The terminal firstly performs channel configuration, equalization demodulation, data processing by higher layer configured information in each time unit cover by higher layer control information (the time unit covered by the higher layer configured information may also be agree). If no dynamic physical layer control information corresponding to the downlink data channel is obtained on a fourth time domain symbol of the current time unit, the terminal gives up the data processing result that has been obtained.

When the dynamic physical layer control information corresponding to the downlink data of the terminal in the current time unit is obtained, the dynamic physical layer control information specifically indicates parameter types needed to be updated in the eleven parameter types, such as five of the eleven parameter types. The dynamic physical layer control information further indicates an update value of the five parameter types needed to be updated or a relevant value of the updated parameter with respect to the higher layer notified parameter.

Embodiment Twenty-Six

In this embodiment, a first resource area corresponding to higher layer control information is a first time window as shown in FIG. 5a, and a second resource area corresponding to dynamic physical layer control information is a second time window as shown in FIG. 5a. The higher layer control information (a notified parameter value is a first transmission parameter) and the dynamic physical layer control information (a notified parameter value is a second transmission parameter) include parameters having the same type, such as information related to a sending beam or information related to a receiving beam.

In a first mode, after a slotn2 (the slotn2 is a time unit in which the dynamic physical layer control information is located), the first transmission parameter is a higher layer notified value, i.e., a slotn3 performs data processing by a higher layer notified beam 1.

In a second mode, after the slotn2 (the slotn2 is a time unit in which the dynamic physical layer control information is located), and the first transmission parameter is an updated to a second transmission parameter value, i.e., the slotn3 performs the data processing by a higher layer notified beam 2.

It is assumed that in this embodiment, a beam notified by the higher layer control information before a slotn1 is 1, a sending beam notified by the dynamic physical layer in the slotn2 is the beam 2.

Embodiment Twenty-Seven

In this embodiment, a terminal is configured with P demodulation reference signal port sets, and P is a natural number greater than 1. Each set in P demodulation reference signal port sets has at least one of corresponding following information:

a third demodulation reference signals set corresponding to the above sets; a frequency domain resource corresponding to the above sets; time domain unit pattern information corresponding to the above sets;

a frequency domain precoding granularity unit corresponding to the above sets;

a time domain precoding granularity unit corresponding to the above sets.

Each set in P demodulation reference signal port sets is configured with at least one of the following information:

the third demodulation reference signals set corresponding to the above sets;

a frequency domain resource corresponding to the above sets;

the time domain unit pattern information corresponding to the above sets; the frequency domain precoding granularity unit corresponding to the above sets; and the time domain precoding granularity unit corresponding to the above sets.

In the above embodiment, the precoding granularity unit or a Bundling area may also be called as a precoding resource block or other equivalent names. In short, in one Bundling area, a sending beam is unchanged, and/or a receiving beam is unchanged. The beam may be a RF beam (in this case, different beams are reflected by different RF precoding), a digital beam (in this case, different beams are reflected by different digital precoding), or a hybrid beam (in this case, different beams are reflected by different RF precoding, and/or different digital precoding). Or the precoding granularity unit is the sending beam, and/or a minimum unit that receives a beam change.

In the above embodiment, higher layer control information includes RRC control information, MAC CE control information, or other control information in the future. In general, the control information is unable to be semi-statically configured, and the time unit for the information changing is greater than one first time unit. The first time unit is a minimum time unit for resource scheduling, or the first time unit is a minimum time unit for the terminal detecting downlink control information. For example, the first time unit is one slot in the NR, or one mini-slot, or one subframe in the LTE.

Embodiment Twenty-Eight

The embodiment of the present disclosure further provides a storage medium. In one embodiment, in this embodiment, the storage medium may be configured to store program codes for executing steps described below.

In S1, multiple transmission parameter sets are acquired, where the multiple transmission parameter sets at least include: a first transmission parameter set, a second transmission parameter set, and transmission parameters having a same type.

In S2, multiple resource areas are determined. The multiple resource areas at least include: a first resource area, a second resource area; the multiple resource areas include at least one of: a time domain resource area, a code domain resource area, a spatial domain resource area, a reference signal resource area.

In S3, information is sent or received on the multiple resource areas according to the multiple transmission parameter sets, which at least includes: sending the information or receiving the information on the first resource area according to the first transmission parameter set; and sending the information or receiving the information on the second resource area according to the second transmission parameter set.

In one implementation mode, the storage medium is further configured to store program codes for executing the following steps:

In S4, a number of parameter configurations X corresponding to a parameter type is determined, where X is a natural number, and there at least exist a first parameter configuration and a first time domain resource area on which a first parameter acts.

In S5, a configuration of a parameter type is acquired according to a determination result.

In S6, in a case that the X is greater than 1, there at least exist a second parameter configuration and a second time domain resource area on which a second parameter acts.

In an implementation mode, in the embodiment, the storage medium may include, but is not limited to, a USB flash disk, a ROM, a RAM, a mobile hard disk, a magnetic disk, an optical disk or another medium capable of storing program codes.

In an embodiment, in this embodiment, a processor executes, according to the program codes stored in the storage medium, steps S1, S2 and S3.

In an embodiment, in this embodiment, a processor executes, according to the program codes stored in the storage medium, steps S4, S5 and S6.

In an embodiment, for specific examples in this embodiment, reference may be made to the examples described in the above embodiments and optional implementation modes, and the specific examples will not be repeated in this embodiment.

Apparently, those skilled in the art should know that each of the above-mentioned modules or steps of the present disclosure may be implemented by a general-purpose computing apparatus, the modules or steps may be concentrated on a single computing apparatus or distributed on a network formed by multiple computing apparatuses, and in an implementation mode, the modules or steps may be implemented by program codes executable by the computing apparatuses, so that modules or steps may be stored in a storage apparatus and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

INDUSTRIAL APPLICABILITY

In technology solution of the present disclosure, multiple transmission parameter sets are acquired, where the multiple transmission parameter sets at least include: a first transmission parameter set, a second transmission parameter set, transmission parameters having a same type. Multiple resource areas are determined, where the multiple resource areas at least include: a first resource area, a second resource area; the multiple resource areas include at least one of: a time domain resource area, a code domain resource area, a spatial domain resource area, a reference signal resource area. Information is sent or received on the multiple resource areas according to the multiple transmission parameter sets, which at least includes: sending the information or receiving the information on the first resource area according to the first transmission parameter set; and sending the information or receiving the information on the second resource area according to the second transmission parameter set. That is, in the present disclosure, through pre-configured or agreed (through higher layer control information or previous physical layer dynamic control information) data/control/parameter signal transmission parameter information, the terminal is enabled to process the data/control/parameter signal based on the pre-configured transmission parameter before more dynamic control information is not acquired, solving the problem in the exiting art of a low modulation data rate at a receiving end, thereby implementing accelerating the processing capability of the terminal and reducing the control information overhead.

What is claimed is:

1. A transmission parameter determination method, comprising:
    acquiring a plurality of transmission parameter sets, wherein the plurality of transmission parameter sets at least comprise: a first transmission parameter set, a second transmission parameter set; wherein each of the plurality of transmission parameter sets comprises one of following parameters: a precoding bundling parameter; a Quasi-Co-Location (QCL) relation indication parameter; or a resource configuration parameter, wherein the resource configuration parameter comprises a type of resource;
    determining a plurality of resource areas, wherein the plurality of resource areas at least comprise: a first resource area, a second resource area; and each resource area comprises at least one of: a time domain resource area, a code domain resource area, a frequency domain resource area, a spatial domain resource area, or a reference signal resource area; and
    sending information or receiving information on the plurality of resource areas according to the plurality of transmission parameter sets, which at least comprises:
    sending information or receiving information on the first resource area according to the first transmission parameter set; and sending information or receiving information on the second resource area according to the second transmission parameter set;
    wherein acquisition manners of the plurality of transmission parameter sets are different, and the acquisition manners comprise:
    acquiring through RRC control information; acquiring through MAC-CE control information; acquiring through physical layer dynamic control information; acquiring through a system message; acquiring through a broadcast message; the transmission parameter being an agreed value; acquiring according to an agreed rule; acquiring through dedicated control information; and acquiring through public control information.

2. The method of claim 1, wherein the sending the information or receiving the information on the plurality of resource areas according to the plurality of transmission parameter sets comprises:
    at an independent acting section of one resource area of the plurality of resource areas, sending or receiving the information at the independent acting section according to the transmission parameter set corresponding to the one resource area; and/or
    at an intersected section of N resource areas in the plurality of resource areas, sending or receiving the information at the intersected section according to N transmission parameter sets corresponding to the N resource areas; or
    at an intersected section of N resource areas in the plurality of resource areas, sending or receiving the information at the intersected section according to one of the N transmission parameter sets corresponding to the N resource areas;
    wherein N is a natural number greater than 1.

3. The method of claim 1, wherein a division mode of the plurality of resource areas comprises at least one of:
    dividing according to a time instant acquiring control information;
    receiving the control information to determine division of the plurality of resource areas, wherein the control information comprises division information of the plurality of resource areas;

determining the division of the plurality of resource areas according to an area where the control information carrying the transmission parameter set acts; or determining the division of the plurality of resource areas according to a rule agreed by a receiving end and a sending end.

4. The method of claim 1, satisfying at least one of following characteristics:

the second resource area is a subset of the first resource area;

an intersection set between the second resource area and the first resource area is empty;

the intersection set between the second resource area and the first resource area is non-empty, and the second resource area and the first resource area do not overlap;

the first resource area and the second resource area are same;

the first resource area is changed according to the second resource area.

5. The method of claim 1, wherein a determination manner of values of partial parameters or all parameters comprised in the first transmission parameter set comprises at least one of:

determining according to a previously configured transmission parameter set, determining according to a radio resource control (RRC) configuration signaling, determining according to a medium access control (MAC) configuration signaling, determining according to a system information block (SIB) message, determining according to a physical broadcast channel (PBCH) message, determining according to common control information, or determining according to a previous agreement of a sending end and a receiving end.

6. The method of claim 1, wherein the plurality of transmission parameter sets satisfy at least one of following characteristics:

a resource area in which a signal or a channel related to the transmission parameter set is located is a subset of the resource area to which the transmission parameter set corresponds;

the resource area in which the signal or the channel related to the transmission parameter set is located and the resource area to which the transmission parameter set corresponds are partially overlapped;

the plurality of transmission parameter sets are notified by a plurality pieces of control information, the plurality of pieces of control information at least comprise first control information and second control information; or the plurality of transmission parameter sets correspond to configuration information of one signal/one channel;

wherein the first control information is used for notifying the first transmission parameter set, the second control information is used for notifying the second transmission parameter set, the transmission parameter set is a transmission parameter of the signal or the channel.

7. The method of claim 3, wherein the time instant acquiring control information comprises a time instant at which information indicated in the control information is applied for reception or transmission of a channel and/or a signal scheduled by the control information; wherein the control information comprises one of: PDCCH, MAC-CE, RRC.

8. The method of claim 3, wherein the dividing according to the time instant acquiring control information comprises at least one of:

an interval between a start position of the first resource area and an end position of the control information being smaller than a preset time threshold; or an interval between a start position of the second resource area and the end position of the control information being larger than or equal to the preset time threshold;

wherein the preset time threshold comprises an minimum interval between the end position of the control information and a time instant at which information indicated in the control information can be applied for reception or transmission of a channel and/or a signal scheduled by the control information.

9. The method of claim 1, comprising at least one of:

the second transmission parameter set is acquired according to information notified in a physical layer dynamic control channel;

the transmission parameters having the same type correspond to a plurality of parameter configurations, and different parameter configurations correspond to different frequency domain resources;

a demodulation reference signal port corresponds to a plurality of parameter configurations, and different parameter configurations correspond to different frequency domain resources occupied by the demodulation reference signal port;

a boundary PRB Bundling area obtained based on a system bandwidth of a transmitting end and a boundary of PRB Bundling area obtained based on a system bandwidth of a receiving end are consistent; wherein the system bandwidth of the receiving end is a subset of the system bandwidth of the transmitting end; or each of the first transmission parameter set and the second transmission parameter set comprises the parameters having the same type.

10. The method of claim 1, the method further comprises:

determining whether a resource of a periodic or semi-persistent measurement reference signal configured by higher layer control information is available according to the physical layer dynamic control information;

performing at least one of following operations according to a determination result:

in response to determining that the resource of the periodic or semi-persistent measurement reference signal is available, sending or receiving the periodic or semi-persistent measurement reference signal;

in response to determining that the resource of the periodic or semi-persistent measurement reference signal is unavailable, not sending or receiving the periodic or semi-persistent measurement reference signal.

11. The method of claim 10, wherein the not sending or receiving the periodic or semi-persistent measurement reference signal comprises:

not sending or receiving the periodic or semi-persistent measurement reference signal on a time domain symbol which is determined being unavailable.

12. A non-transitory storage medium, storing computer-executable instructions which are configured to execute the transmission parameter determination method of claim 1.

13. A transmission parameter determination method, comprising:

determining a number X of parameter configurations corresponding to a parameter type, wherein X is a natural number, and there at least exist a first parameter configuration and a first time domain resource area on which the first parameter configuration acts;

acquiring a configuration of the parameter type according to a determination result; and in a case that the X is greater than 1, there at least exist a second parameter configuration and a second time domain resource area on which the second parameter configuration acts;

wherein acquisition manners of the plurality of parameter configurations are different, and the acquisition manners comprise:

acquiring through RRC control information; acquiring through MAC-CE control information; acquiring through physical layer dynamic control information; acquiring through a system message; acquiring through a broadcast message; the transmission parameter being an agreed value; acquiring according to an agreed rule; acquiring through dedicated control information; and acquiring through public control information.

14. The method of claim 13, wherein in response to determining that the X is 1, determining the configuration of the parameter type according to the first parameter configuration;

in response to determining that the X is greater than 1, determining a time domain resource area corresponding to each transmission configuration in the X parameter configurations;

at an independent acting section of one time domain resource area, determining the configuration of the parameter type according to the parameter configuration corresponding to the time domain resource area;

at an intersected section of Y time domain resource areas of X time domain resource areas, determining the configuration of the parameter type according to Y parameter configurations corresponding to the Y time domain resource areas, or determining the configuration of the parameter type according to one of the Y parameter configurations corresponding to the Y time domain resource areas; wherein Y is a natural number greater than 1 and less than X.

15. The method of claim 13, wherein
the first parameter configuration is configured by higher layer control information, the second parameter configuration is configured by physical layer control information; or
the first parameter configuration is configured by RRC control information, the second parameter configuration is configured by MAC CE control information.

16. The method of claim 13, wherein the parameter type comprises one of: a precoding bundling parameter a Quasi-Co-Location (QCL) relation indication parameter; or a resource configuration parameter;

wherein the resource configuration parameter comprise a type of resource.

17. The method of claim 13, wherein in a case that X is larger than 1, the X parameter configurations satisfy at least one of following characteristics:

a time domain area in which a signal or a channel related to the parameter configuration is located is a subset of the time domain resource area to which the parameter configuration corresponds;

the time domain resource area in which the signal or the channel related to the parameter configuration is located and the time domain resource area to which the parameter configuration corresponds are partially overlapped;

the plurality of parameter configurations are notified by a plurality of pieces of control information, the plurality of pieces of control information at least comprise first control information and second control information; or the plurality of parameter configurations correspond to configuration information of one signal/one channel;

wherein the first control information is used for notifying the first parameter configuration, the second control information is used for notifying the second parameter configuration, the parameter configuration is a transmission parameter of the signal.

18. A non-transitory storage medium, storing computer-executable instructions which are configured to execute the transmission parameter determination method of claim 13.

19. A transmission parameter determination device, comprising:

a processor; and a memory for storing instructions executable by the processor;

wherein the processor is configured to:

acquire a plurality of transmission parameter sets, wherein the plurality of transmission parameter sets at least comprise: a first transmission parameter set, a second transmission parameter set; wherein each of the plurality of transmission parameter sets comprises one of following parameters: a precoding bundling parameter; a Quasi-Co-Location (QCL) relation indication parameter; or a resource configuration parameter; wherein the resource configuration parameter comprises a type of resource;

determine a plurality of resource areas, wherein the plurality of resource areas at least comprise: a first resource area, a second resource area; and each resource area comprises at least one of: a time domain resource area, a code domain resource area, a frequency domain resource area, a spatial domain resource area, a reference signal resource area; and send information or receive information on the plurality of resource areas according to the plurality of transmission parameter sets, which at least comprises: sending information or receiving information on the first resource area according to the first transmission parameter set; and sending information or receiving information on the second resource area according to the second transmission parameter set;

wherein acquisition manners of the plurality of transmission parameter sets are different, and the acquisition manners comprise:

acquiring through RRC control information; acquiring through MAC-CE control information; acquiring through physical layer dynamic control information; acquiring through a system message; acquiring through a broadcast message; the transmission parameter being an agreed value; acquiring according to an agreed rule; acquiring through dedicated control information; and acquiring through public control information.

20. A transmission parameter determination device, comprising:

a processor; and a memory for storing instructions executable by the processor;

wherein the processor is configured to:

determine a number X of parameter configurations corresponding to a parameter type, wherein X is a natural number, and there at least exist a first parameter configuration and a first time domain resource area on which the first parameter configuration acts;

acquire a configuration of the parameter type according to a determination result;

in a case that the X is greater than 1, determine that there at least exist a second parameter configuration and a second time domain resource area on which the second parameter configuration acts;

wherein acquisition manners of the plurality of parameter configurations are different, and the acquisition manners comprise:

acquiring through RRC control information; acquiring through MAC-CE control information; acquiring through physical layer dynamic control information; acquiring through a system message; acquiring through a broadcast message; the transmission parameter being an agreed value; acquiring according to an agreed rule; acquiring through dedicated control information; and acquiring through public control information.

\* \* \* \* \*

UNITED STATES PATENT AND TRADEMARK OFFICE
CERTIFICATE OF CORRECTION

Page 1 of 2

PATENT NO. : 11,082,970 B2
APPLICATION NO. : 16/497736
DATED : August 3, 2021
INVENTOR(S) : Shujuan Zhang It is certified that error appears in the above-identified patent and that said Letters Patent is hereby corrected as shown below:

In the Specification

In Column 3, Line 33, delete "athere" and insert --there--.

In Column 10, Line 11, delete "Budling" and insert --Bundling--.

In Column 10, Line 19, delete "Budling" and insert --Bundling--.

In Column 10, Line 20, delete "Budling" and insert --Bundling--.

In Column 25, Line 27, delete "in FIG. 6a, in FIG. 6a," and insert --in FIG. 6a,--.

In Column 31, Line 4, delete "port{1}" and insert --port {1}--.

In Column 32, Line 43, delete "reference." and insert --reference,--.

In Column 34, Line 47, delete "(the" and insert --the--.

In Column 37, Line 19, delete "the" and insert --The--.

In Column 39, Line 28, delete "set Or" and insert --set. Or--.

In Column 43, Line 63, delete "slotn+k." and insert --slotn+K.--.

In Column 44, Line 51, delete "1," and insert --2,--.

In Column 44, Line 61, delete "DMRSd1" and insert --DMRS d1--.

In Column 44, Line 61, delete "d1," and insert --d2,--.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,082,970 B2

In Column 46, Line 21, delete "Twenty Four" and insert --Twenty-Four--.

In the Claims

In Column 51, Line 48, Claim 6, delete "plurality pieces" and insert --plurality of pieces--.

In Column 53, Line 47, Claim 16, delete "parameter" and insert --parameter;--.